United States Patent
Mohan et al.

(10) Patent No.: US 10,154,539 B2
(45) Date of Patent: Dec. 11, 2018

(54) SYSTEM AND METHOD FOR SHARING CELLULAR NETWORK FOR CALL ROUTING

(71) Applicant: SONY CORPORATION, Tokyo (JP)

(72) Inventors: Awadh Bihari Mohan, Bangalore (IN); Pramod Chintalapoodi, San Diego, CA (US); Maneesh Mohanan Bava, Bangalore (IN); Ashritha Shenoy Udyavar, Bangalore (IN); Smikky Sahaya Singh, Bangalore (IN); Hanumantha Reddy Uruvakili, Bangalore (IN); Sachin Nagappa Agsebagil, Bangalore (IN)

(73) Assignee: SONY CORPORATION, Tokyo (JP)

( * ) Notice: Subject to any disclaimer, the term of this patent is extended or adjusted under 35 U.S.C. 154(b) by 33 days.

(21) Appl. No.: 15/241,402

(22) Filed: Aug. 19, 2016

(65) Prior Publication Data
US 2018/0054852 A1    Feb. 22, 2018

(51) Int. Cl.
H04W 88/04    (2009.01)
H04M 3/58    (2006.01)

(52) U.S. Cl.
CPC ............ *H04W 88/04* (2013.01); *H04M 3/58* (2013.01); *H04M 2207/18* (2013.01)

(58) Field of Classification Search
CPC .............................. H04W 88/04; H04W 88/06
See application file for complete search history.

(56) References Cited

U.S. PATENT DOCUMENTS 4,675,863 A * 6/1987 Paneth ................. H04L 1/0003
370/334
8,228,861 B1 * 7/2012 Nix ....................... H04W 36/00
370/329
(Continued)

FOREIGN PATENT DOCUMENTS

JP    2010-252232 A    11/2010
JP    2013-239907 A    11/2013
(Continued)

OTHER PUBLICATIONS

Extended European Search Report of EP Application No. 17186063.8, dated Nov. 23, 2017, 7 pages EESR.
(Continued)

*Primary Examiner* — Dong-Chang Shiue
(74) *Attorney, Agent, or Firm* — Chip Law Group

(57) ABSTRACT

Various aspects of a system and method to share cellular communication networks to route calls are disclosed herein. In accordance with an embodiment, the system includes a first communication device that receives a call establishment request via a first communication network that connect the first communication device with a second communication device. The call establishment request includes a subscriber identification number associated with a third communication device. Thereafter, a routing of a call between the second communication device and the third communication device is enabled by use of the subscriber identification number, via a second communication network associated with a first subscriber module of the first communication device. The establishment and/or routing of the call is based on the received call establishment request.

22 Claims, 10 Drawing Sheets

(56) References Cited

U.S. PATENT DOCUMENTS

| | | |
|---|---|---|
| 8,838,069 B2 | 9/2014 | Chakraborty et al. |
| 2012/0084397 A1 | 4/2012 | Shinohara |
| 2012/0149328 A1* | 6/2012 | Chakraborty ..... H04M 3/42238 |
| | | 455/411 |
| 2012/0276912 A1 | 11/2012 | Zhang et al. |
| 2014/0176659 A1* | 6/2014 | Khay-Ibbat ............ H04N 7/148 |
| | | 348/14.02 |
| 2014/0362751 A1 | 12/2014 | Chen et al. |
| 2016/0014579 A1* | 1/2016 | Kasilya Sudarsan ... H04W 4/16 |
| | | 455/417 |

FOREIGN PATENT DOCUMENTS

| | | |
|---|---|---|
| JP | 2013-258770 A | 12/2013 |
| JP | 2014-007634 A | 1/2014 |
| KR | 10-2007-0040943 A | 4/2007 |

OTHER PUBLICATIONS

Office Action for JP Patent Application No. 2017-153552, dated May 30, 2018, 05 pages of Office Action and 04 pages of English Translation.

Office Action for KR Patent Application No. 10-2017-0101620, dated Jun. 19, 2018, 05 pages of Office Action and 06 pages of English Translation.

* cited by examiner

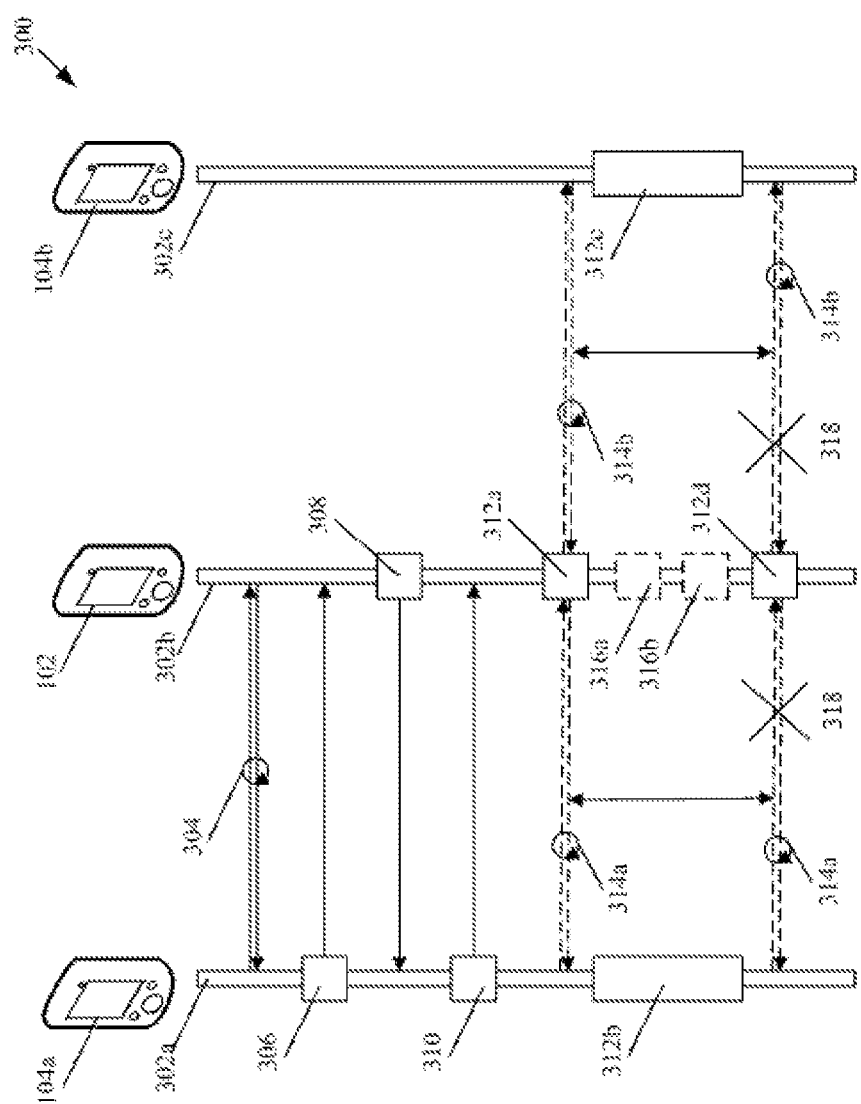

SYSTEM AND METHOD FOR SHARING CELLULAR NETWORK FOR CALL ROUTING

CROSS-REFERENCE TO RELATED APPLICATIONS/INCORPORATION BY REFERENCE

None.

FIELD

Various embodiments of the disclosure relate to cellular communication. More specifically, various embodiments of the disclosure relate to a system and method for sharing of cellular networks to route calls.

BACKGROUND

With the growth of communication technology, various types of communication networks have been developed that support enhanced data rates and large user base. The growth of these communication networks has been supported by research and development in the field of communication protocols and standards and their increased adoption by the telecom industry. However, due to uneven network deployment and varied terrains across various regions, it may be difficult to obtain effective signal strength of a communication network throughout its range. Hence, communication devices of users located at various regions may receive weaker signals (or no signals) compared to that of the rest of the users. In such cases, calls may not be possible for those communication devices that receive weak signals or no signals at all. Hence, there is a need for a system for smart sharing of communication networks, such as a cellular network, between communication devices to route calls.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and system to share cellular networks to route calls substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 3 illustrates an exemplary sequence diagram to illustrate call routing by a communication device, in accordance with an embodiment of the disclosure.

DETAILED DESCRIPTION

Figure 1:
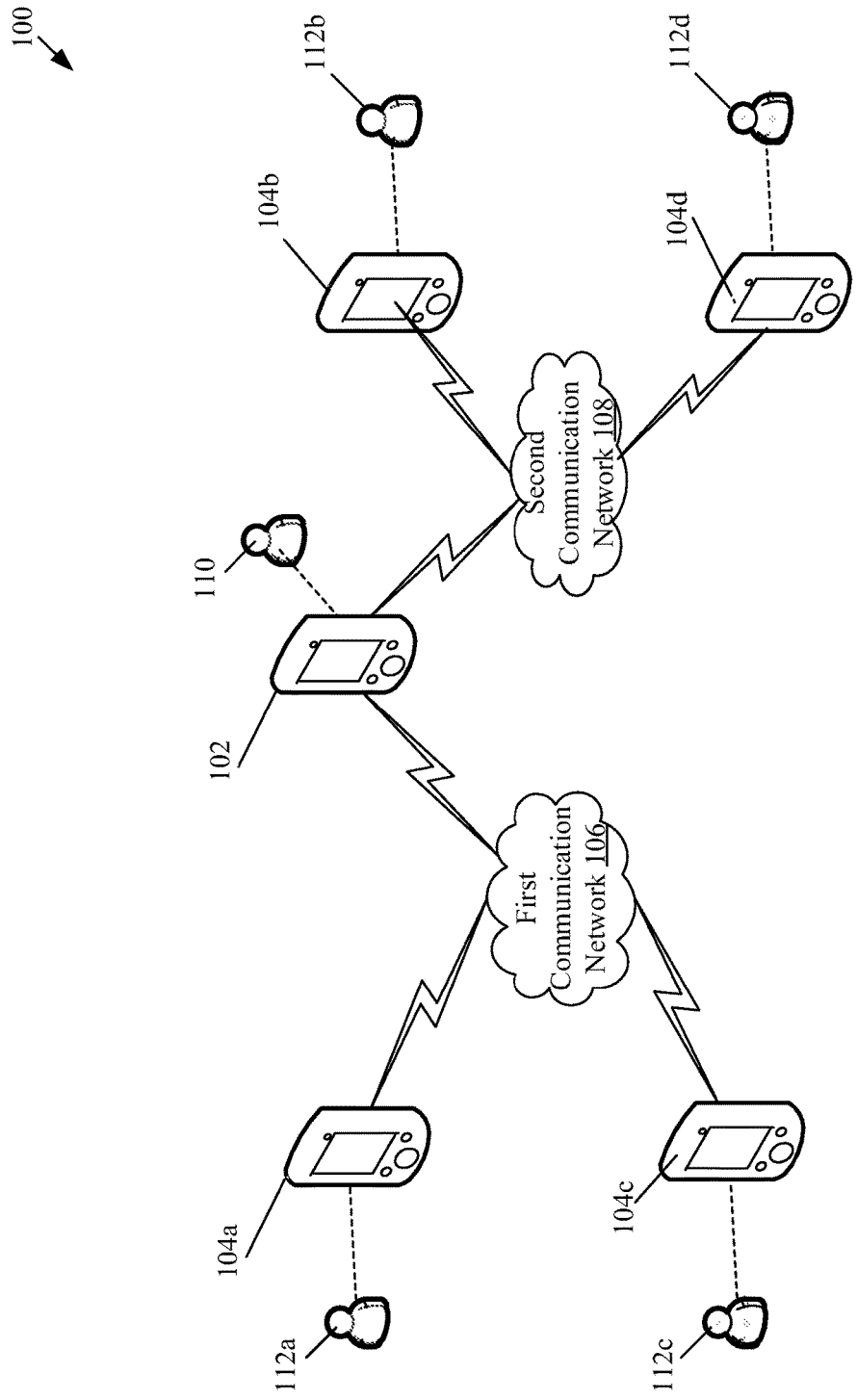
FIG. 1 illustrates an exemplary environment to share cellular networks to route calls, in accordance with an embodiment of the disclosure.

The following described implementations may be found in the disclosed method and system to share cellular networks to route calls. Exemplary aspects of the disclosure may include a system that may include a first communication device. The first communication device may receive a call establishment request via a first communication network that may connect the first communication device with a second communication device. The call establishment request may include a subscriber identification number associated with a third communication device. Thereafter, routing of a call between the second communication device and the third communication device may be enabled by use of the received subscriber identification number via the first communication network. The call may be routed via a second communication network associated with a first subscriber module of the first communication device, in response to the received call establishment request.

In accordance with an embodiment, the first communication network may correspond to one of: a Bluetooth-based network, a Wi-Fi based network, a Light-Fidelity based network, a short-range wireless communication network, a Wi-Max based network, an Internet-of-Things (IoT) network, and/or a Machine-Type-Communication (MTC) network. The second communication network may correspond to a cellular communication network. In addition, the call may correspond to one of: a simplex-voice call, a half-duplex voice call, a duplex-voice call, a video call, and/or a data transfer call.

In accordance with an embodiment, a network share request may be received from the second communication device, via the first communication network, for transfer of a permission to use at least one subscriber module of the first communication device. The first communication device may transmit a permission to the second communication device to use the first subscriber module from one or more subscriber modules provided in the first communication device. The permission may be transmitted via the first communication network.

In accordance with an embodiment, the first communication device may be configured to establish the call between the second communication device and the third communication device, via the second communication network. This may be accomplished by use of the first subscriber module and may be based on the received call establishment request.

In accordance with an embodiment, a first audio-input device and/or a first audio-output device associated with the first subscriber module may be disabled, based on the establishment of the call between the second communication device and the third communication device. During the call, the first communication device may receive an outgoing data stream of the call from the second communication device, via the first communication network. The first communication device may store the received outgoing data stream in a transmission buffer that may correspond to a first transceiver of the first communication device. In accordance with an embodiment, the first transceiver may correspond to the first subscriber module of the first communication device. To route the call, the first communication device may transmit the outgoing data stream stored in the transmission buffer, to the third communication device, via the second communication network.

In accordance with an embodiment, the first communication device may receive an incoming data stream of the call from the third communication device, via the second communication network. The first communication device may store the received incoming data stream in a reception buffer that may correspond to the first transceiver of the first communication device. As discussed, the first transceiver may correspond to the first subscriber module of the first communication device. Further, the first communication device may transmit the incoming data stream stored in the reception buffer to the second communication device, via the first communication network for the routing of the call.

In accordance with an embodiment, the first communication device may be further configured to transmit another permission to use a second subscriber module to another communication device (such as a fourth communication device). The second subscriber module may be from amongst a plurality of subscriber modules provided in the first communication device. In accordance with an embodiment, the fourth communication device may be connected to the first communication network, but disconnected to the second communication network. The other permission may be transmitted via a communication channel that connects the first communication device to the fourth communication device throughout the call. The communication channel used during this call may correspond to a separate communication link established on the first communication network (that is, a communication link other than that associated with the routing of the ongoing call, via the first communication network). The first communication device may route the other call in parallel with the ongoing routed call. The second call may be established by use of the second subscriber module of the first communication device.

In accordance with an embodiment, the first communication device may be configured to establish a new call with another communication device (such as a fifth communication device), via the cellular communication network associated with the second subscriber module. The second subscriber module may be one of the plurality of subscriber modules of the first communication device. The new call may be established in parallel to the ongoing call between the second communication device and the third communication device.

In accordance with an embodiment, the routed call may correspond to a two-way call between the second communication device and the third communication device. All pre-installed applications in the first communication device may be operable throughout the call between the second communication device and the third communication device.

In accordance with an exemplary aspect of the disclosure, there may be provided a first communication device that may include one or more circuits that may be configured to establish a wireless connection with a second communication device via a first communication network. Thereafter, a call establishment request may be transmitted to the second communication device via the first communication network that may connect the first communication device to the second communication device. The call establishment request may include a subscriber identification number associated with a third communication device. Further, establishing of a call may be enabled between the first communication device and the third communication device via the second communication device. The call may be routed by the second communication device to the third communication device by use of the received subscriber identification number. The call may be routed via a second communication network associated with a subscriber module of the second communication device.

In accordance with an embodiment, the first communication device may be disconnected from the second communication network due to an inadequate subscription account balance. Further, the first communication device may be disconnected due to the lack of network coverage that results in an unavailability of network signals of the second communication network at a current location of the first communication device. Other reasons for the disconnection may include an absence of a subscriber module in the first communication device, and/or a network operator-based call barring for the first communication device.

In accordance with an embodiment, a control of a telephony application associated with the subscriber module of the second communication device may be received. The received control of the telephony application at the first communication device may enable dialing of the subscriber identification number at the first communication device for the transmission of the subscriber identification number to the second communication device. Alternatively, an input may be received via a pre-installed application in the first communication device to enable dialing of the subscriber identification number via the pre-installed application at the first communication device for the transmission of the subscriber identification number to the second communication device.

In accordance with an embodiment, the first communication device may be configured to transmit an outgoing data stream of the call to the second communication device, via the first communication network. The outgoing data stream may be routed from the second communication device to the third communication device, via the second communication network available at the second communication device. In accordance with an embodiment, the second communication device may be further configured to receive an incoming data stream of the call from the third communication device, via the second communication network. To route the call to the first communication device, the second communication device may be configured to record the incoming data stream of the call received from the third communication device, via the second communication network. Thereafter, the second communication device may transmit the recorded incoming data stream to the first communication device, via the first communication network.

FIG. 1 illustrates an exemplary environment to route calls, in accordance with an embodiment of the disclosure. With reference to FIG. 1, there is shown an exemplary environment 100. The exemplary environment 100 may include a first communication device 102, a second communication device 104a, a third communication device 104b, a fourth communication device 104c, and a fifth communication device 104d. There is further shown a first communication network 106, a second communication network 108, and one or more users, such as a first user 110, a second user 112a, a third user 112b, a fourth user 112c, and a fifth user 112d.

In accordance with an embodiment, the first communication device 102 may correspond to an electronic device that may include suitable logic, circuitry, and/or code for communication with other communication devices, via one or more communication networks. Further, the first user 110 may correspond to a user of the first communication device 102. In accordance with an embodiment, the first communication device 102 may be simultaneously connected to both the first communication network 106 and the second communication network 108. The first communication device 102 may include one or more subscriber modules to facilitate a communication between communication devices. In accordance with an embodiment, the first communication device 102 may be configured to facilitate routing of two calls in parallel, by use of two subscriber modules simultaneously. In accordance with an embodiment, the calls may correspond to a simplex-voice call, a half-duplex voice call, a duplex-voice call, a video call, and/or a data transfer call. Examples of the first communication device 102 may include, but not limited to, a smartphone, a wearable device, a tablet computer, a laptop, a personal computer, and the like.

In accordance with an embodiment, the second communication device 104a may include suitable logic, circuitry, and/or code to communicate with one or more other communication devices, via the first communication network 106. The second user 112a may correspond to a user of the second communication device 104a. Examples of the second communication device 104a may include, but not be limited to, a smartphone, a mobile device, a wearable device, a tablet computer, a laptop, a personal computer, and the like. In accordance with an embodiment, the second communication device 104a may be similar to the first communication device 102.

In accordance with an embodiment, the third communication device 104b may include suitable logic, circuitry, and/or code to communicate with one or more other communication devices, via the second communication network 108. The third user 112b may correspond to user of the third communication device 104b. In accordance with an embodiment, the third communication device 104b may be connected to the second communication network 108, however, may be disconnected from the first communication network 106.

The third communication device 104b may receive calls that originate from the second communication device 104a, routed by the first communication device 102, via the second communication network 108. Alternatively, the third communication device 104b may also receive calls that originate from the first communication device 102. Examples of the third communication device 104b may include, but not be limited to, a smartphone, a wearable device, a tablet computer, a laptop, a personal computer, and the like. In accordance with an embodiment, the third communication device 104b may be similar to the first communication device 102.

As shown in FIG. 1, like the second communication device 104a, the fourth communication device 104c may be connected to the first communication network 106 and disconnected from the second communication network 108. Further, similar to the third communication device 104b, the fifth communication device 104d may also be connected to the second communication network 108, while being disconnected from the first communication network 106. Further, the fourth user 112c may correspond to a user of the fourth communication device 104c, while the fifth user 112d may correspond to a user of the fifth communication device 104d. Examples of the fourth communication device 104c and the fifth communication device 104d may include, but not be limited to, a smart phone, a wearable device, a tablet computer, a laptop, a personal computer, and the like. In accordance with an embodiment, the fourth communication device 104c and the fifth communication device 104d may be similar to the first communication device 102.

The first communication network 106 may be a medium that may enable communication between the first communication device 102 and the second communication device 104a. The first communication network 106 may also connect the fourth communication device 104c to the first communication device 102. The first communication network 106 may be implemented by one or more wireless communication technologies known in the art. Examples of wireless communication networks may include, but not be limited to, a Bluetooth based network, a Wireless-Fidelity (Wi-Fi) based network, a Light-Fidelity (Li-Fi) based network, a short-range or medium-range wireless communication network, Internet-of-Things (IoT) network, Machine-Type-Communication (MTC) network, and/or a Wi-Max based network.

The second communication network 108 may be a medium that may enable communication between the first communication device 102 and the third communication device 104b. The second communication network 108 may also connect the fifth communication device 104d to the first communication device 102, as shown. The second communication network 108 may be implemented by one or more wireless communication technologies known in the art. Examples of the wireless communication networks may include, but not be limited to, a cellular or mobile network, such as Global System for Mobile Communications (GSM), General Packet Radio Service (GPRS), Enhanced Data Rates for GSM Evolution (EDGE), Universal Mobile Telecommunication System (UMTS), Digital Enhanced Cordless Telecommunication (DECT), Digital AMPS (IS-136/TDMA), Integrated Digital Enhanced Network (iDEN), Code Division Multiple Access (CDMA), 1G, 2G, 3G, 4G Long Term Evolution (LTE), 5G, and/or the Internet.

In accordance with an embodiment, the first communication device 102 may be connected to the second communication network 108, such as a cellular network, whereas the second communication device 104a may be disconnected from the second communication network 108. For instance, as shown in FIG. 1, the second communication device 104a may be connected to the first communication network 106, and disconnected from the second communication network 108. Disconnection of the second communication device 104a may be due to an inadequate subscription account balance and/or an unavailability of network signals of the second communication network 108, such as the cellular network, at a current location of the second communication device 104a. Unavailability of network signals may be due to lack of network coverage. Other reasons for being disconnected from the second communication network 108 may include an absence of a subscriber module associated with a telephony application in the second communication device 104a, and/or a network operator-based call barring for the second communication device 104a. The second user 112a of the second communication device 104a may want to call another user, such as the third user 112b associated with the third communication device 104b.

In operation, the second communication device 104a may be configured to establish a wireless connection with the first communication device 102, via the first communication network 106, such as a Wi-Fi network. The first communication device 102 may be configured to receive a network share request from the second communication device 104a for transfer of a permission to use at least one subscriber module of the first communication device 102. The network share request may be received via the first communication network 106. The first communication device 102 may be configured to transmit a permission to the second communication device 104a to use a first subscriber module from one or more subscriber modules provided in the first communication device 102. The permission may be transmitted via the first communication network 106.

In accordance with an embodiment, the second communication device 104a may be configured to transmit a call establishment request to the first communication device 102, via the first communication network 106 that connects the first communication device 102 with the second communication device 104a. The call establishment request may include a subscriber identification number associated with the third communication device 104b. The first communication device 102 may receive the call establishment request from the second communication device 104a.

In accordance with an embodiment, the first communication device 102 may be configured to enable a control of a telephony application associated with the first subscriber module (such as a first SIM) of the first communication device 102, by the second communication device 104a. The control of the telephony application at the second communication device 104a may enable dialing of the subscriber identification number at the second communication device 104a for the transmission of the subscriber identification number to the first communication device 102. Alternatively, an input may be received via a pre-installed application in the second communication device 104a to enable dialing of the subscriber identification number at the second communication device 104a for the transmission of the subscriber identification number to the first communication device 102. In such an embodiment, the input may be received after the permission to use the first subscriber module of the first communication device 102 may be granted.

In accordance with an embodiment, the first communication device 102 may be configured to enable establishing and routing a call between the second communication device 104a and the third communication device 104b, by use of the received subscriber identification number (such as a mobile number). The call may be routed via the second communication network 108 associated with the first subscriber module of the first communication device 102 based on the received call establishment request. The first subscriber module (such as first SIM) may be the subscriber module of the first communication device 102 for which the usage permission may be previously granted to the second communication device 104a, by the first communication device 102.

The first communication device 102 may disable a first audio input device, such as an inbuilt microphone, and/or a first audio output device, such as an inbuilt speaker, associated with the first subscriber module, when the call is established. Based on the disabled first audio input device and/or the first audio output device, the first user 110 of the first communication device 102 may be isolated from the audio associated with the ongoing call. Further, the noise or ambient audio input associated with the first communication device 102 may not be mixed with audio stream of the ongoing call based on the disabling of the first audio input device.

In accordance with an embodiment, the second communication device 104a may receive voice input from the second user 112a. The voice input may be call data that the second user 112a of the second communication device 104a may want to communicate to a desired distant user, such as the third user 112b, of the third communication device 104b. The second communication device 104a may record the voice input from the second user 112a and may packetize the recorded voice input to be transmitted to the first communication device 102 over the first communication network 106.

During the call, the first communication device 102 may receive an outgoing data stream of the call from the second communication device 104a, via the first communication network 106, such as over the established Wi-Fi connection. The first communication device 102 may store the received outgoing data stream in a transmission buffer that corresponds to a first transceiver of the first communication device 102. In accordance with an embodiment, the first transceiver may be associated with the first subscriber module of the first communication device 102. To route the call, the first communication device 102 may transmit the outgoing data stream stored in the transmission buffer, to the third communication device 104b, via the second communication network 108 (the cellular network).

During the call, the third communication device 104b may receive voice input from the third user 112b, which may transmitted over the second communication network 108 (a normal cellular call) to the first communication device 102. In accordance with an embodiment, the first communication device 102 may receive an incoming data stream of the call from the third communication device 104b, via the second communication network 108, such as the cellular network. The first communication device 102 may store the received incoming data stream in a reception buffer that corresponds to the first transceiver of the first communication device 102. As discussed, the first transceiver may correspond to the first subscriber module of the first communication device 102. Further, the first communication device 102 may transmit the incoming data stream stored in the reception buffer to the second communication device 104a, via the first communication network 106 for the routing of the call.

In accordance with an embodiment, the first communication device 102 may be further configured to transmit another permission, to use a second subscriber module from a plurality of subscriber modules (such as dual SIM) provided in the first communication device, to another communication device. An example of such other communication device may include the fourth communication device 104c. The other permission may be transmitted via a communication channel (Wi-Fi channel) of the first communication network 106 that may connect the first communication device 102 with the fourth communication device 104c. For instance, the other permission may be transmitted via the communication channel (separate from that between the first communication device 102 and the second communication device 104a) over the first communication network 106, such as a Wi-Fi network. The first communication device 102 may be configured to route another call associated with the transmitted other permission in parallel with the ongoing call by use of the second subscriber module, via the second communication network 108.

In accordance with an embodiment, the call between the second communication device 104a and the third communication device 104b, which may be routed by the first communication device 102, may correspond to a two-way call. All pre-installed applications of the first communication device 102 may be operable throughout the call between the second communication device 104a and the third communication device 104b. As all pre-installed applications of the first communication device 102 may be operable throughout the call, the first communication device 102 may be configured to establish a parallel call with another communication device (such as the fifth communication device 104d), via the second communication network 108, by use of the second subscriber module (such as a second SIM). This call may be established in parallel to the ongoing call between the second communication device 104a and the third communication device 104b.

For instance, the first user 110 of the first communication device 102 may dial the subscriber identification number (such as mobile number) of another user, such as the fifth user 112d of the fifth communication device 104d. This call by the first communication device 102 may be a parallel call to the ongoing call between the second communication device 104a and the third communication device 104b. This call may be established between the first communication device 102 and the fifth communication device 104d, by use of the second subscriber module, via the second communication network 108. In such an instance, the first communication device 102 may be referred to as "Multi-SIMs multi-calls" mobile phone or a smart call router device. Further, the call establishment process that enables such communication, where multiple subscriber modules (multiple SIMs) may be active at the same time for calling, may be referred to as "multi-active calls" enabling technology. In the "multi-active calls" enabling technology, the transmission and reception buffers associated with multiple transceivers may be active at the same time to handle multiple calls.

Figure 2:
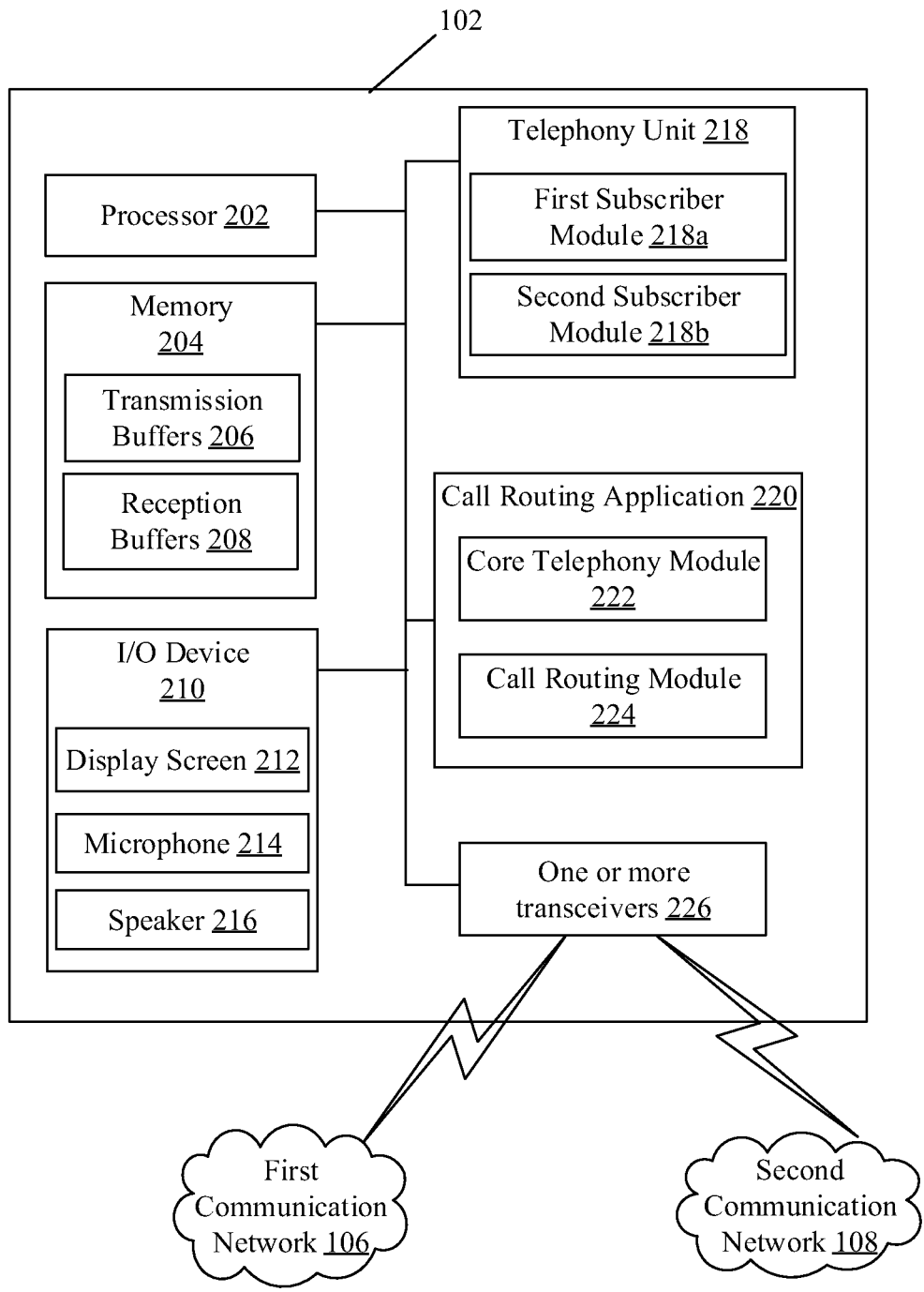
FIG. 2 is a block diagram that illustrates an exemplary communication device to share cellular networks to route calls, in accordance with an embodiment of the disclosure.

FIG. 2 is a block diagram that illustrates an exemplary communication device to route calls, in accordance with an embodiment of the disclosure. FIG. 2 is explained in conjunction with elements from FIG. 1. With reference to FIG. 2, there is shown the first communication device 102. The first communication device 102 may include a processor 202 and a memory 204. The memory 204 may include transmission buffers 206 and reception buffers 208. The first communication device 102 may further include an input/output (I/O) device 210, which may include a display screen 212, a microphone 214, and a speaker 216. The first communication device 102 may further include a telephony unit 218 and a call routing application 220. The telephony unit 218 may include a first subscriber module 218a and a second subscriber module 218b. The call routing application 220 may include a core telephony module 222 and a call routing module 224. There is further shown one or more transceivers 226 provided in the first communication device 102.

In accordance with an embodiment, the first communication device 102 may be communicatively coupled to one or more communication devices through the first communication network 106, and/or the second communication network 108, via the one or more transceivers 226. The processor 202 may be communicatively coupled to the memory 204, the I/O device 210, the telephony unit 218, and/or the one or more transceivers 226, via a system bus. A person with ordinary skill in the art may understand that the second communication device 104a, the third communication device 104b, the fourth communication device 104c, and/or the fifth communication device 104d may be similar to the first communication device 102. Hence, the aforementioned communication devices may have similar components and functionality as that described with reference to the first communication device 102 in FIG. 2.

The processor 202 may comprise suitable logic, circuitry, interfaces, and/or code that may be configured to execute a set of instructions stored in the memory 204. The processor 202 may be implemented, based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 204 may comprise suitable logic, circuitry, and/or interfaces that may be configured to store a set of instructions executable by the processor 202. The memory 204 may be further configured to store one or more data streams associated with ongoing calls that may be handled by the first communication device 102. The memory 204 may further store data related to the call routing application 220 and/or the telephony unit 218. For instance, the memory 204 may store contact details, calling history, and/or call-preferences of the first user 110. Examples of implementation of the memory 204 may include, but not limited to, Random Access Memory (RAM), Read Only Memory (ROM), Hard Disk Drive (HDD), and/or a Secure Digital (SD) card.

In accordance with an embodiment, the transmission buffers 206 and the reception buffers 208 may correspond to dedicated portions of the memory 204, which may be reserved to store call related data. In accordance with an embodiment, both of the transmission buffers 206 and the reception buffers 208 may include a separate memory region dedicated to each of the first subscriber module 218a and the second subscriber module 218b. For instance, the first of these memory regions in both the transmission buffers 206 and the reception buffers 208 may be used to store an incoming data stream and an outgoing data stream, respectively. The incoming and outgoing data streams may be from a call routed by use of the first subscriber module 218a. In accordance with an embodiment, the transmission buffers 206 and the reception buffers 208 may be implemented as memory registers that may belong to a portion of the memory 204.

The I/O device 210 may comprise suitable logic, circuitry, interfaces, and/or code for various input and output devices that may be configured to communicate with the processor 202. The I/O device 210 may be configured to receive an input from the first user 110. The input from the first user 110 may correspond to a command to make a voice, video, or data call with a communication device of another user by use of one of the first subscriber module 218a or the second subscriber module 218b. The input may also include a confirmation from the first user 110, to share one of the first subscriber module 218a or the second subscriber module 218b to route a call for another communication device. In addition, the first user 110 may provide an input to operate one or more applications of the first communication device 102. Examples of the input devices may include, but are not limited to, an imaging unit, a camcorder, a touch screen, a keyboard, a mouse, a joystick, the microphone 214, a motion sensor, a light sensor, and/or a docking station. In accordance with an embodiment, the I/O device 210 may also include one or more front-facing or rear-facing cameras that may be used to record video feeds of a user or other objects around the user. The one or more front facing or rear-facing cameras may also be used during a video call.

The I/O device 210 may also be configured to provide an output to the first user 110. The output may correspond to audio and/or video output that may correspond to an ongoing call between the first user 110 and a communication device of another user. The output may also be associated with an application that is operated on the first communication device 102. Examples of the output devices may include, but may not be limited to, the display screen 212, a projector screen, and/or a speaker 216.

The display screen 212 may comprise suitable circuitry and/or interfaces that may be configured to display image and/or video output to the first user 110. The display screen 212 may be configured to simultaneously receive one or more input actions from the first user 110, via a touch sensitive screen. Such one or more input actions may be received from the first user 110, by means of a virtual keypad, a stylus, a touch-based input action, and/or a gesture. The display screen 212 may be realized through several known technologies such as, but not limited to, Liquid Crystal Display (LCD) display, Light Emitting Diode (LED) display, plasma display, and/or Organic LED (OLED) display technology, and/or other display.

The microphone 214 may comprise suitable circuitry and/or interfaces to receive an audio input. In accordance with an embodiment, the audio input may be provided by the first user 110. The audio input may correspond to a voice call made by the first user 110. The first user 110 may make the voice call with a communication device of another user. In accordance with an embodiment, the microphone 214 may be muted or disabled during the routing of a call of another communication device (such as the second communication device 104a), via the first communication device 102. Though FIG. 2 is shown to include a single microphone 214, a person skilled in the art may understand that the first communication device 102 may include multiple microphones. The other microphones may be associated with the other subscriber modules and/or enabled for use with other applications of the first communication device 102.

The speaker 216 may comprise suitable circuitry and/or interfaces to generate an audio output for the first user 110. In accordance with an embodiment, the audio output may correspond to a voice call made by the first user 110. The first user 110 may make the voice call with a communication device of another user. In accordance with an embodiment, the speaker 216 may be muted or disabled during routing of call of a communication device (such as the second communication device 104a), via the first communication device 102. Though FIG. 2 is shown to include a single speaker 216, a person skilled in the art may understand that the first communication device 102 may include multiple speakers. The other speakers may be associated with the other subscriber modules and/or enabled for use with other applications of the first communication device 102.

The telephony unit 218 may comprise suitable logic, circuitry, interfaces, and/or code that may be configured to manage user subscription and account credentials for communication by the first communication device 102. In accordance with an embodiment, the telephony unit 218 may be provided with the first subscriber module 218a, which may enable connectivity of the first communication device 102 to the second communication network 108. The telephony unit 218 may also be provided with the second subscriber module 218b (in case of Dual SIM). The telephony unit 218 may be configured to manage validation and authentication of the first subscriber module 218a and/or the second subscriber module 218b, for connectivity to the second communication network 108 and/or establishment of calls. The telephony unit 218 may be also configured to manage handling of calls that originate or terminate at the first communication device 102, by use of the first subscriber module 218a and/or the second subscriber module 218b. A person skilled in the art may understand that though only two subscriber modules are shown in FIG. 1, the scope of the disclosure may not be limited to this example. In an embodiment, the telephony unit 218 may include only one subscriber module. Alternatively, the telephony unit 218 may include more than two subscriber modules.

The first subscriber module 218a may correspond to a subscriber identity module (SIM) card, a Unique Integrated Circuit Card (UICC)-based smart-card, or a SIM implemented as software SIM. The first subscriber module 218a may include information related to a mobile subscriber identification of the first user 110. A secure key may be required to validate and authenticate the first communication device 102 to use the first subscriber module 218a. A person skilled in the art may understand that the first subscriber module 218a may be inserted into a slot provided in the first communication device 102 and may be removable there from. Further, the second subscriber module 218b may be similar to the first subscriber module 218a. However, the second subscriber module 218b may be associated with a different mobile subscriber identification of the first user 110. Alternatively, the second subscriber module 218b may also be associated with a different user of the first communication device 102. This may be the case where the first communication device 102 corresponds to a multi-user device, such that each user has a different profile (including mobile subscriber identification number). A person skilled in the art may also understand the first subscriber module 218a and the second subscriber module 218b may be associated with the same network service provider without departure from the scope of the disclosure. Alternatively, the first subscriber module 218a may be associated with a first network service provider, while the second subscriber module 218b may be associated with a second network service provider, different from the first network service provider. In case of different service providers, the first communication device 102 may be connected to two different cellular networks of the different service providers. Based on the use of both the first subscriber module 218a and the second subscriber module 218b, two simultaneous calls may be established and/or routed via the second communication network 108 (such as the cellular network).

The call routing application 220 may comprise suitable logic, circuitry, interfaces, and/or code that may be configured to route calls between two communication devices under the control of the processor 202. The call routing application 220 may be configured to establish and handle calls in parallel by use of the first subscriber module 218a and the second subscriber module 218b. In accordance with an embodiment, the call routing application 220 may be a part of the processor 202. Alternatively, the call routing application 220 may be implemented as a separate processor or circuitry in the first communication device 102. In accordance with an embodiment, the call routing application 220 and the processor 202 may be implemented as an integrated processor or a cluster of processors that perform the functions of the call routing application 220 and the processor 202. In accordance with an embodiment, the call routing application 220 may be implemented as a set of instructions stored in the memory 204, which upon execution by the processor 202, may perform the functions of the call routing application 220.

The core telephony module 222 may comprise suitable logic, circuitry, interfaces, and/or code that may be configured to perform call management operations, which may include call establishment and/or call termination. In accordance with an embodiment, a separate instance of the core telephony module 222 may be used for each subscriber module associated with the telephony unit 218. Each instance of the core telephony module 222 may be executed as a separate application and/or process by the processor 202. In accordance with an embodiment, the core telephony module 222 may provide a user (such as the first user 110 or the second user 112a) a dialing interface to input a subscriber identification number and/or select a contact from a contacts database stored in the memory 204. In accordance with an embodiment, the presented dialing interface may correspond to a specific subscriber module from amongst the subscriber modules of the telephony unit 218. Based on the input provided through the dialing interface, the core telephony module 222 may establish a call by use of one of the first subscriber module 218a, or the second subscriber module 218b, via the second communication network 108.

The call routing module 224 may comprise suitable logic, circuitry, interfaces, and/or code that may be configured to route a call between two communication devices. Based on a call establishment request received from a communication device (such as the second communication device 104a), the call routing module 224 may select a subscriber module that is currently available for use. The call establishment request may include a subscriber identification number of a callee communication device (such as the third communication device 104b). The call routing module 224 may use the currently available subscriber module (such as the first subscriber module 218a) to establish and/or route a call between the second communication device 104a and the third communication device 104b, via the second communication network 108. A person with ordinary skill in the art may understand that the core telephony module 222 and the call routing module 224 may be implemented as a single module within the call routing application 220, without departure from the scope of the disclosure.

The one or more transceivers 226 may comprise suitable logic, circuitry, interfaces, and/or code that may be configured to communicate with other communication devices, via the first communication network 106, and/or the second communication network 108. The one or more transceivers 226 may implement known technologies to support wireless communication. The one or more transceivers 226 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The one or more transceivers 226 may communicate via wireless communication with networks, such as the Internet, an Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11a, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

In operation, the processor 202 may receive a network share request from the second communication device 104a, via the first communication network 106. The network share request may be received via a first transceiver of the one or more transceivers 226 by use of the call routing application 220. The processor 202 may transmit a permission to use the first subscriber module 218a to the second communication device 104a, via the first communication network 106 by use of the call routing application 220. The permission may be transmitted in response to the network share request.

In accordance with an embodiment, the processor 202, by use of the call routing module 224, of the first communication device 102, may receive a call establishment request from the second communication device 104a. The call establishment request may be received via the first communication network 106, by use of the first transceiver of the one or more transceivers 226. The call establishment request may include a subscriber identification number (such as a mobile number) of the third communication device 104b. The first communication device 102 may receive the call establishment request from the second communication device 104a.

In accordance with an embodiment, the second communication device 104a may also have a call routing application (similar to the call routing application 220) installed therein. A user of the second communication device 104a (such as the second user 112a) may provide a subscriber identification number of a user who is to be called (a callee, such as the third user 112b). The subscriber identification number may be provided by use of the complementary call routing application of the second communication device 104a, which may present a dialing interface and/or contacts register to the second user 112a. The subscriber identification number as dialed at the second communication device 104a may be transmitted to the first communication device 102 over the first communication network 106.

In accordance with an embodiment, alternatively, the processor 202 may transmit a control of a telephony application, such as the core telephony module 222, associated with a subscriber module, to the second communication device 104a, via the first communication network 106. For instance, the processor 202 may enable a remote or terminal access of an instance of the core telephony module 222 (and/or the call routing application 220) associated with a subscriber module (such as the first subscriber module 218a) to the second communication device 104a. The remote access may enable dialing of the subscriber identification number via the presented instance of the telephony application. The subscriber identification number dialed via the remote or terminal access may be transmitted to the first communication device 102 as the call establishment request.

In accordance with an embodiment, the processor 202 may select an available subscriber module from the plurality of subscriber modules provided in the telephony unit 218 (such as the first subscriber module 218a and the second subscriber module 218b). The selection may be made by use the core telephony module 222 of the call routing application 220. For instance, the first subscriber module 218a may be selected when both the subscriber modules (SIMs) are available at the first communication device 102. Thereafter, a call may be established between the second communication device 104a and the third communication device 104b, by use of the first subscriber module 218a, and two communication network, such as the first communication network 106 and the second communication network 108.

In accordance with an embodiment, processor 202 may be configured to disable or mute the microphone 214 and/or the speaker 216 by use of the call routing module 224, based on the establishment of the call. Based on the disabling of the microphone 214 and the speaker 216, the outgoing data stream and the incoming data stream of the call may not be effected by and/or played to the first user 110. In accordance with an embodiment, only the microphone and speaker associated with the first subscriber module (the subscriber module currently in use) of the first communication device 102 may be disabled. The first communication device 102 may include other microphones and speakers that may remain enabled for simultaneous use by other applications of the first communication device 102. Alternatively, in accordance with an embodiment, the microphone and speaker be disassociated with the first subscriber module (the subscriber module currently in use) of the first communication device 102, while may be associated with the second subscriber module.

In accordance with an embodiment, the call routing module 224 may be configured to store the outgoing data stream of the call routed between the second communication device 104a and the third communication device 104b, in the transmission buffers 206. The outgoing data stream may be received from the second communication device 104a by the one or more transceivers 226, via the first communication network 106.

The call routing module 224, under the control of the processor 202, may transmit the outgoing data stream to the third communication device 104b by use of the one or more transceivers 226, via the second communication network 108. In accordance with an embodiment, the call routing module 224 may be further configured to store incoming data stream of the call between the second communication device 104a and the third communication device 104b, in the reception buffers 208. The incoming data stream may be received from the third communication device 104b by the one or more transceivers 226, via the second communication network 108. The call routing module 224 may transmit the incoming data stream to the second communication device 104a by use of the one or more transceivers 226, via the first communication network 106.

In accordance with an embodiment, the call may correspond to one of: a simplex-voice call, a half-duplex voice call, a duplex-voice call, a video call, and/or a data transfer call. An exemplary sequence diagram of call-routing by the first communication device 102 is explained in FIG. 3. In accordance with an embodiment, the first communication device 102 may be configured to route and/or handle two calls in parallel based on use of the two subscriber modules simultaneously. In a first scenario, another call, such as a second call, may be a routed call that may involve a communication device that is connected to the first communication network 106, but disconnected from the second communication network 108. The fourth communication device 104c is an example of such a communication device. The first scenario may be similar to that described above, except for the use of the second subscriber module 218b for routing of the second call, instead of the first subscriber module 218a, which may already be in use by the second communication device 104a.

In a second scenario, the second call may correspond to a call that may be initiated by a user of the first communication device 102 (such as the first user 110) in parallel to the ongoing routed call. In this scenario, the second call may originate from the first communication device 102 and be directed to another communication device, which may connected to the second communication network 108, but not connected to the first communication network 106. The fifth communication device 104d is an example of such a communication device, which may be a destination of such a second call. Thus, the second scenario may correspond to establishment of a direct call by the first communication device 102, by use of the second subscriber module 218b. Exemplary scenarios of the first communication device 102 for call routing are explained in FIGS. 4A, 4B, and 4C.

In accordance with an embodiment, the transmission buffers 206 and the reception buffers 208 may support buffering of call related data of at least two ongoing calls, simultaneously. The first call may be established and/or routed by use of the first subscriber module 218a, while the second call may be established and/or routed by use of the second subscriber module 218b. Thus, the first communication device 102 may use the "multi-active calls" functionality, where two or more subscriber modules (or SIMs) may be simultaneously active for two or more calls that may continue in parallel. Further, multiple transmission buffers 206 and reception buffers 208 may be simultaneously active for the two or more calls. For instance, a first transmission buffer (say, TxB1) from the transmission buffers 206 may buffer outgoing data stream for the first call, while a first reception buffer (say, RxB1) from the reception buffers 208 may buffer incoming data stream for the first call. A second transmission buffer (say, TxB2) from the transmission buffers 206 and a second reception buffer (say, RxB2) from the reception buffers 208 may be active in parallel to buffer outgoing and incoming data streams of a second call that may be established in parallel to the first call. Thus, multiple transmission and reception buffers may be active to buffer call related data of multiple calls simultaneously.

A person skilled in the art may understand that the call routing provided for in the various embodiments of the disclosure may be useful in various scenarios. For instance, a user, such as the first user 110, may be enabled to share a cellular network available to first communication device 102 to another nearby communication device (such as the second communication device 104a), when cellular network coverage may not be available to the other user's communication device (such as the second communication device 104a). However, a local short range communication network may be established by the communication device (such as the first communication device 102) to share a cellular network with other nearby communication devices (such as the second communication device 104a or the fourth communication device 104c). Examples of such a scenario include, a zero subscription account balance, a lack of network signals of a cellular service provider at a current location of the user, and/or call-barring enabled by the cellular service provider of the user. The user may or may not pay for sharing of the cellular network based on the user's association with the other user.

In accordance with an embodiment, the third communication device 104b may receive an identification number of a caller (caller ID) associated with the call routed to the third communication device 104b. The third communication device 104b may receive a subscriber identification number associated with the first subscriber module 218a, such as a mobile number, associated with the first subscriber module 218a, of the first communication device 102, through which the call may be routed. In such a scenario, to the third communication device 104b, the call may appear to be originated from the first communication device 102 by use of the first subscriber module 218a (although the call may be actually originated or initiated by the second communication device 104a). The subscriber identification number associated with the second communication device 104a may be unknown to the third communication device 104b. In such an embodiment, the first communication device 102 may communicate a caller notification to the third communication device 104b to inform the actual caller (such as second user 112a) of the call. For example, "This is a smart routed call; the actual caller for this call is <Name> or <subscriber identification number>" of the second user 112a associated with second communication device 104a, as received from the second communication device 104a or as stored in the contact list of the first communication device 102. The caller notification may be an SMS, a flash message, or the call routing application 220 generated notification that may be communicated by the first communication device 102 to the third communication device 104b. In accordance with an embodiment, the caller notification may be communicated prior to establishment of the call or along with the call, so that the third user 112b associated with the third communication device 104b may be notified about the actual caller, that is, the second user 112a.

Alternatively, the third communication device 104b may also include a complementary call routing application (similar to the call routing application 220 of the first communication device 102) installed therein. In such a scenario, the routing of the call via the first communication device 102 may be transparent to the third communication device 104b. That is, the third communication device 104b may not be aware of the subscriber identification number associated with the first subscriber module 218a, through which the call may be routed. For the third communication device 104b, the call may appear to originate directly from the second communication device 104a. Further, in accordance with an embodiment, both the caller ID of the first communication device 102 and the second communication device 104a may be displayed at the third communication device 104b. For example, "The actual caller is <second communication device 104a> and the call is routed by <first communication device 102>. It may be useful as the third user 112b of the third communication device 104b, may not know or be acquainted with the user, such as the first user 110, of the first communication device 102. Thus, may reject a call from an unknown number. Thus, the caller notification or the displayed caller ID of the second communication device 104a, may let the third user 112b know about the actual caller. It may also be useful from telecom regulations compliance perspective to display the caller ID of the actual caller.

In accordance with an embodiment, the first communication device 102 may correspond to a smart device installed in a home space or a pre-defined area for use by residents, occupants, or visitors of the pre-defined area, such as an office premises or a tourist place. The smart device may have built-in subscriber modules for communication with cellular networks (such as the second communication network 108). Further, the smart device may also be connected to a Wi-Fi network associated with the pre-defined area (such as the first communication network 106). In accordance with an embodiment, the smart device may act as smart calls router used to route calls, which may originate from a communication device (such as the second communication device 104a). It may be useful for a communication device (such as the second communication device 104a), which may otherwise not be able to call to a remote communication device (such as the third communication device 104b) using a pre-subscribed cellular network (such as the second communication network 108).

For example, the smart device may correspond to a dedicated device that may be used to facilitate a call between a nearby communication device (such as the second communication device 104a) and a remote communication device (such as the third communication device 104b) which have network coverage of the cellular network. The nearby communication device (such as the second communication device 104a) may be connected to the smart device, via a Wi-Fi network or other short or medium-range communication networks in the home space. The nearby communication device (such as the second communication device 104a) may not directly call the remote communication device (such as the third communication device 104b) due to various factors, such as network coverage issues at the current location of the nearby communication device (such as the second communication device 104a), as discussed in FIG. 1. Examples of such dedicated device may include, but not limited to, a network call router, a network bridge, a call hotspot device, and/or a Wi-Fi-to-cellular network gateway. The smart device may also correspond to a mobile device that may include the call routing application 220 installed therein. Thus, by use of the smart device, multiple family members of a household may share cellular network associated with the subscriber modules of the smart device. For instance, when a family member runs out of subscriber account balance associated with family member's cellular service operator, the smart device may be used to route calls to a desired communication device. The usage of the smart device to route the calls, including the use of the cellular network for the call, may be billed to an owner of the smart device (such as a head of the family).

In accordance with an embodiment, when a call is established between the second communication device 104a and the third communication device 104b via the first communication device 102, the microphone 214 and the speaker 216 of the first communication device 102 associated with the first subscriber module 218a may be disabled during the routing of the call. In such an embodiment, the first user 110 may not listen to the ongoing call or access to the call data temporarily buffered at the transmission buffers 206 and the reception buffers 208, may not be provided at the first communication device 102. Such call data temporally buffered at the transmission buffers 206 and the reception buffers 208, may be deleted at the end of each routed call, such as when the call is terminated.

In accordance with an embodiment, when a call is established between the second communication device 104a and the third communication device 104b via the first communication device 102, the first communication device 102 may also join the call as a user-controlled conference call (not a cellular network service provider based conference call facility). In such an embodiment, the first communication device 102, by use of the call routing application 220, may communicate a "call join" request to one or both of the second communication device 104a and the third communication device 104b. Based on the acceptance or denial of the "call join" request, the first communication device 102 may also join or may not be allowed to join the call as the user-controlled conference call.

In accordance with another embodiment, the first communication device 102 may initiate a conference call by establishing a call with a third communication device 104b, connected via the second communication network 108. Thereafter, the first communication device 102 may connect with the second communication device 104a, via the first communication network 106. As the first communication network 106 may not be a cellular network, the first communication device 102 may not require use of a SIM module for the establishment of the connectivity with the second communication device 104a. Upon connection with the second communication device 104a using the first communication network 106, the second communication device 104a may be patched-in on the ongoing call between the first communication device 102 and the third communication device 102b. At this stage, the call between the first communication device 102 and the third communication device 102b may be converted into a conference call with the addition of the second communication device 102a to the call.

In accordance with an embodiment, the first communication device 102 may host a wireless hotspot, which may provide connectivity to multiple communication devices. In such a case, the first communication network 106 may act as a wireless hotspot access point that may provide Wi-Fi connectivity to the multiple communication devices at the same time. In such a scenario, the first communication device 102 may provide a conference calling facility to the multiple connected communication devices, which may act as participants of the conference call. The conference call may also include at least one other communication device as a participant, wherein the at least one other communication device may be connected to the first communication device 102 through the second communication network 108.

It is to be understood that the operations performed by the first electronic device 102 may be implemented in a modified fixed-line telephone (another smart device) which may include wireless transceivers and suitable one or more subscriber identification modules to enable simultaneous connection with both the first communication network 106 and the second communication network 108. In such as case, the modified fixed-line telephone may be configured to perform the operations described in FIGS. 1 and 2.

FIG. 3 illustrates an exemplary sequence diagram to depict call routing by a communication device, in accordance with an embodiment of the disclosure. With reference to FIG. 3, there is a shown a sequence diagram 300, which is described in conjunction with elements from FIGS. 1 and 2. The sequence diagram 300 includes the first communication device 102, the second communication device 104a, and the third communication device 104b. There is further shown a first timeline 302a, a second timeline 302b, and a third timeline 302c. There is also shown a first connection step 304, a request step 306, and primary call related steps including a call initiation step 308, a first in-call step 310a, a second in-call step 310b, and a call termination step 318. A first communication channel 312, a second communication channel 314, an application operation step 316a, and a secondary call related step 316b are also shown in the sequence diagram 300.

In accordance to the sequence diagram 300, the first timeline 302a may correspond to a timeline that shows steps associated with the second communication device 104a. The second timeline 302b may correspond to a timeline that illustrates steps associated with the first communication device 102. The third timeline 302c may correspond to the steps associated with the third communication device 104b.

At the first connection step 304, the second communication device 104a may establish a communication session with the first communication device 102, via the first communication network 106. In accordance with an embodiment, the communication session may be established based upon a pairing or peer-to-peer (P2P) communication protocol. For instance, a Bluetooth or Wi-Fi P2P communication session may be established between the first communication device 102 and the second communication device 104a, based on a pairing key or network key entered on one or both of the communication devices in accordance to the P2P communication protocol.

At the request step 306, the second communication device 104a may transmit a call establishment request to the first communication device 102, via the communication session with the first communication network 106. The call establishment request may include the subscriber identification number of the third user 112b, provided by the second user 112a, via a dialing interface. The dialing interface may be provided on the second communication device 104a, via a complementary call routing application installed on the second communication device 104a.

Alternatively, after the establishment of the communication session via the first communication network 106, the second communication device 104a may transmit a network share request to the first communication device 102, via the communication session. The first communication device 102 may grant the second communication device 104a a permission to a subscriber module from the plurality of subscriber modules provided in the first communication device 102, in response to the network share request. A message indicative of the granted permission associated with one of the subscriber modules (such as the first subscriber module 218a) may be transmitted to the second communication device 104a, via the communication session. Thereafter, the second communication device 104a may receive a control of an instance of the core telephony module 222, which may be associated with the first subscriber module 218a from the first communication device 102. A dialer interface may be provided on the second communication device 104a by that instance of the core telephony module 222. The second user 112a may input the subscriber identification number of the third user 112b via the dialer interface, so provided. Thereafter, a call establishment request including the subscriber identification number may be transmitted by the second communication device 104a to the first communication device 102, via the first communication channel, as described in request step 306.

At the call initiation step 308, the first communication device 102 may establish a call (such as a voice call) between the second communication device 104a and the third communication device 104b, via the second communication network 108 (a cellular network). In accordance with an embodiment, processor 202 may establish the call between the second communication device 104a and the third communication device 104b, by use of the first subscriber module 218a, based on the call establishment request. The call may be established by use of the instance of the core telephony module 222, which may be associated with the first subscriber module 218a. The call may include two different communication channels. The first communication channel 312 may connect the first communication device 102 with the second communication device 104a, via the first communication network 106. Further, the second communication channel 314 may connect the first communication device 102 to the third communication device 104b, via the second communication network 108. In other words, the first communication device 102 may be configured to operate as a bridge between the two communication devices (the second communication device 104a and the third communication device 104b) to route a call between these communication devices.

The first in-call step 314a and the second in-call step 314b may correspond to complementary call-handling steps during a call, performed by the second communication device 104a and the third communication device 104b, simultaneously. During the first in-call step 314a, the second communication device 104a may record audio input of the call received from the second user 112a through a microphone of the second communication device 104a. Thereafter, via the first communication channel 312 (such as Wi-Fi channel or other P2P communication channel), the second communication device 104a may send the recorded audio input as outgoing data stream to the first communication device 102.

The first communication device 102 may receive the outgoing data stream from the second communication device 104a via the first communication channel 312 and may route the outgoing data stream to the third communication device 104b, via the second communication channel 314 (cellular network).

The first in-call step 314a and the second in-call step 314b may further include a simultaneous receipt of incoming data stream associated with audio output of the call received from the third communication device 104b associated with the third user 112b. The incoming data stream may be received by the first communication device 102 via the second communication channel 314 and recorded by the first communication device 102. The first communication device 102 may then transmit the recorded incoming data stream to the second communication device 104a. Thereafter, the second communication device 104a may receive the recorded incoming data stream from the first communication device 102, via the first communication channel 312. The incoming data stream may then be played to the second user 112a through a speaker of the second communication device 104a.

The microphone 214 and the speaker 216 of the first communication device 102, which may be associated with the first subscriber module 218a, may be disabled during the routing of the call. However, the first communication device 102 may be functional otherwise for the first user 110. Any other microphone or speaker present in the first communication device 102 may be operational for other purposes. In accordance with an embodiment, the microphone 214 and the speaker 216 of the first communication device 102 although disabled to use the first subscriber module 218a active in the ongoing call, may be enabled for the second subscriber module 218b.

At the application operation step 316a, the first user 110 may use one or more features of the first communication device 102, based on operation of one or more applications installed on the first communication device 102. For instance, the first user 110 may perform a calculation operation by use of a calculator application of the first communication device 102. Further, the first user 110 may play one or more gaming applications installed on the first communication device 102.

At the secondary call related step 316b, the first communication device 102 may establish and/or route another call associated with another communication device by use of the second subscriber module 218b. In a first scenario, the control of an instance of the core telephony module 222, associated with the second subscriber module 218b, may be granted to the other communication device (such as the fourth communication device 104c), via the first communication network 106. The first scenario may be similar to the call routing associated with the second communication device 104a, as described herein, except for the use of the second subscriber module 218b instead of the first subscriber module 218a. In a second scenario, the first user 110 may initiate a call with another communication device (such as the fifth communication device 104d), by use of the second subscriber module 218b. Thus, this call may correspond to a direct call made by the first communication device 102, with the fifth communication device 104d, via the second communication network 108.

The first and second scenarios may be performed in parallel with the ongoing call routed between the second communication device 104a, and the third communication device 104b. Thus, the second subscriber module 218b may be used to establish and/or route calls in parallel with the call associated with the first subscriber module 218a. In addition, the application operation step 316a and the secondary call related step 316b may be performed in any order between and/or after the primary call related steps 308, 310a, 310b, and 318, without departure from the scope of the disclosure.

At the call termination step 318, the call between the second communication device 104a and the third communication device 104b may be terminated. In accordance with an embodiment, the call routing module 224 and/or the instance of the core telephony module 222 associated with the first subscriber module 218a may be configured to terminate the call under the control of the processor 202. The call may be terminated based on a call termination request received from either of the two communication devices. That is, when either or both of the users of the second communication device 104a, and the third communication device 104b, end the conversation by disconnecting their devices. At this point, the call termination step 318 may be initiated. The call termination step 318 may include disconnection of the first communication channel 312, between the first communication device 102 and the second communication device 104a. The call termination step 318 may further include the disconnection of the second communication channel 314, between the first communication device 102, and the third communication device 104b.

Figure 4A:
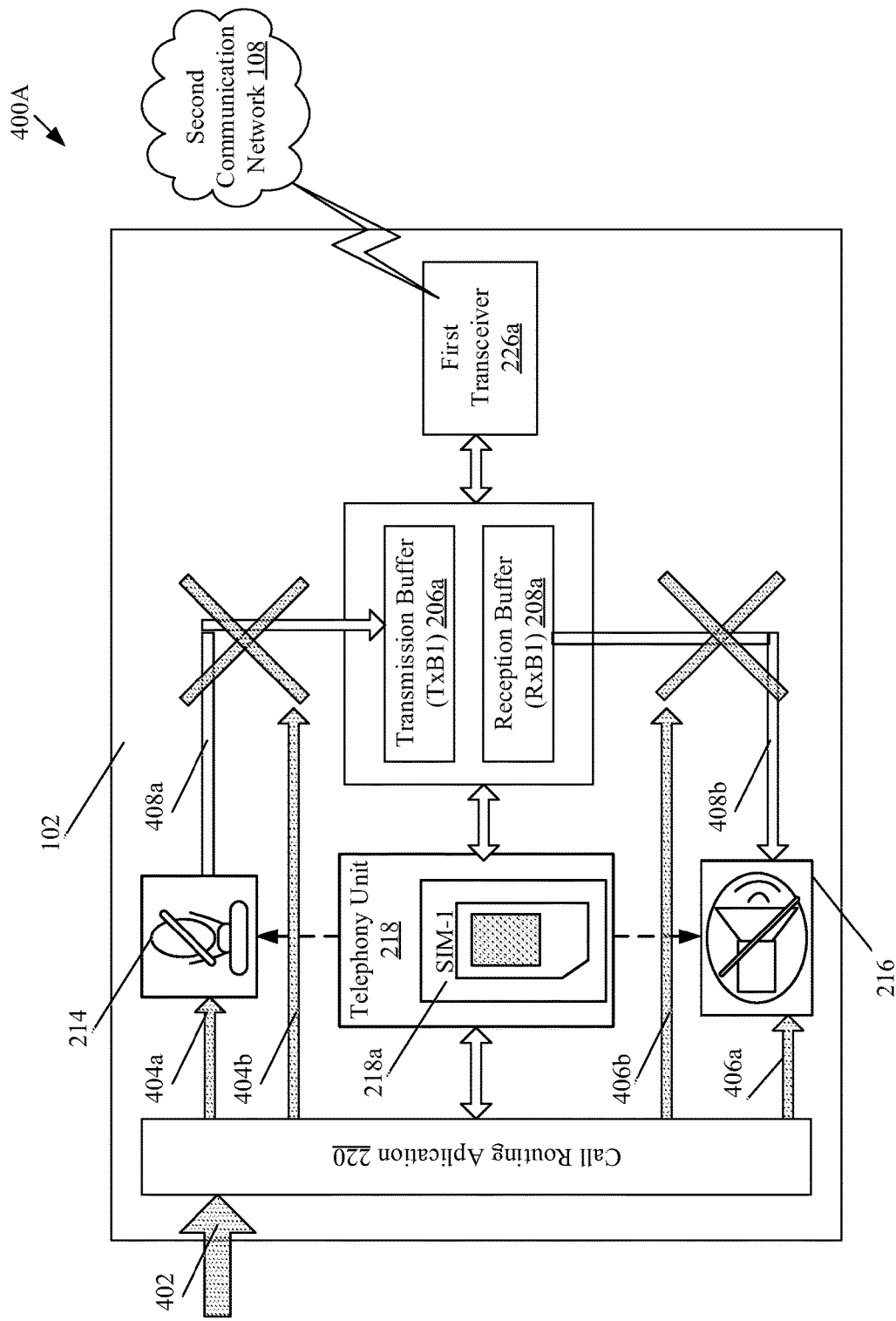
FIGS. 4A, 4B, 4C, and 4D illustrate exemplary scenario diagrams for implementation of the disclosed system and method to share cellular network to route calls, in accordance with an embodiment of the disclosure.

FIGS. 4A, 4B, 4C, and 4D illustrate exemplary scenario diagrams of a communication device for call routing, in accordance with an embodiment of the disclosure. FIGS. 4A, 4B, 4C, and 4D are explained in conjunction with elements from FIGS. 1, 2, and 3. With reference to FIG. 4A, there is shown a first exemplary scenario 400A of the first communication device 102, to route a call. In FIG. 4A, the first communication device 102 is shown to include the call routing application 220, the telephony unit 218 with the first subscriber module 218a (represented as SIM-1), the microphone 214, and the speaker 216. There is further shown a transmission buffer (TxB1) 206a, a reception buffer (RxB1) 208a, a first transceiver 226a, and the second communication network 108 connected to the first transceiver 226a.

The TxB1 206a may correspond to a first buffer from the transmission buffers 206. The RxB1 208a may correspond to a first buffer from the reception buffers 208. Further, the TxB1 206a and the RxB1 208a may be associated with the first transceiver 226a from the one or more transceivers 226. Also, the buffers TxB1 206a and RxB1 208a may be associated with the first subscriber module 218a, such as the SIM-1, as shown in FIG. 4A, to buffer data related to calls made through the first subscriber module 218a, such as the SIM-1.

In addition, FIG. 4A illustrates various data flow steps between the different components of the first communication device 102. The data flow steps may include receipt of a dialer input 402, a microphone-disable command 404a, a microphone-buffer disable command 404b, a speaker-disable command 406a, and a speaker-buffer disable command 406b. Further shown are communication paths (that may include system buses) between the microphone 214 and the TxB1 206a, such as a first system bus 408a, and between the speaker 216 and RxB1 208a, such as a second system bus 408b. The first communication device 102 may include various other components, as shown in FIG. 2, but for the sake of brevity are excluded from FIG. 4A.

The first exemplary scenario 400A may correspond to the case where a call establishment request is received by the first communication device 102 from the second communication device 104a, via the first communication network 106. A complementary call routing application (similar to the call routing application 220) may be installed on the second communication device 104a, which may present a dialer interface and/or contacts register to the second user 112a. The second user 112a may dial a subscriber identification number of a user who is to be called (such as the third user 112b). The call establishment request may be generated by the second communication device 104a, in response to the received input from the second user 112a. The call establishment request may include the subscriber identification number of the third user 112b. The dialer input 402 in FIG. 4A depicts the reception of the call establishment request by the first communication device 102 by use of the call routing application 220.

Alternatively, the second communication device 104a may transmit a network share request to the first communication device 102, via the first communication network 106. The first communication device 102 may transfer a permission associated with a subscriber module (such as the first subscriber module 218a) to the second communication device 104a, via the first communication network 106, in response to the network share request. Thereafter, the second communication device 104a may receive a control of an instance of the core telephony module 222, which may be associated with the first subscriber module 218a from the first communication device 102. A dialer interface may be provided on the second communication device 104a by that instance of the core telephony module 222. The second user 112a may provide the subscriber identification number of the third user 112b via the dialer interface, so provided. Thereafter, a call establishment request including the subscriber identification number may be transmitted by the second communication device 104a to the first communication device 102, via the first communication network 106 (as shown by the dialer input 402).

In accordance with an embodiment, the processor 202, by use of the call routing application 220, may be configured to disable the microphone 214 and/or the speaker 216 for the establishment of the call between the second communication device 104a and the third communication device 104b. Upon receipt of the dialer input 402, the processor 202, by use of the call routing application 220, may disable the microphone 214 by sending the microphone-disable command 404a to the microphone 214. Further, the processor 202, by use of the call routing application 220, may send the microphone-buffer disable command 404b to one or more of: the microphone 214, the first system bus 408a, and/or the transmission buffer TxB1 206a. Based on the receipt of the microphone-disable command 404a, the microphone 214 may be muted. Further, the first system bus 408a may be deactivated, based on the microphone-buffer disable command 404b. Thereafter, the transmission buffer TxR1 206a may be available for the outgoing data stream of the call (that is call data received from the second communication device 104a) to be routed.

In accordance with an embodiment, the processor 202, by use of the call routing application 220, may be configured to disable or mute the speaker 216 by sending the speaker-disable command 406a to the speaker 216. Further, the processor 202, by use of the call routing application 220, may send the speaker-buffer disable command 406b to one or more of: the speaker 216, the second system bus 408b, and/or the reception buffer RxB1 208a. Based on the receipt of the speaker-disable command 406a, the speaker 216 may be switched off. Further, the second system bus 408b may be de-activated, based on the speaker-buffer disable command 406b. Thereafter, the reception buffer RxB1 208a may be available for the incoming data stream of the call (that is call data received from the third communication device 104b) to be routed.

When the microphone 214 and the speaker 216 are disabled, the first user 110 may be isolated from the incoming data streams associated with the ongoing routed call. Further, ambient noise in the environment of the first user 110 may not be included within the outgoing data streams associated with the ongoing routed call. In addition, if the first communication device 102 includes one or more other microphones and/or speakers, these may be operational on the first communication device 102 for other purposes (such as another call or operation of an application) in parallel to the ongoing call.

Figure 4B:
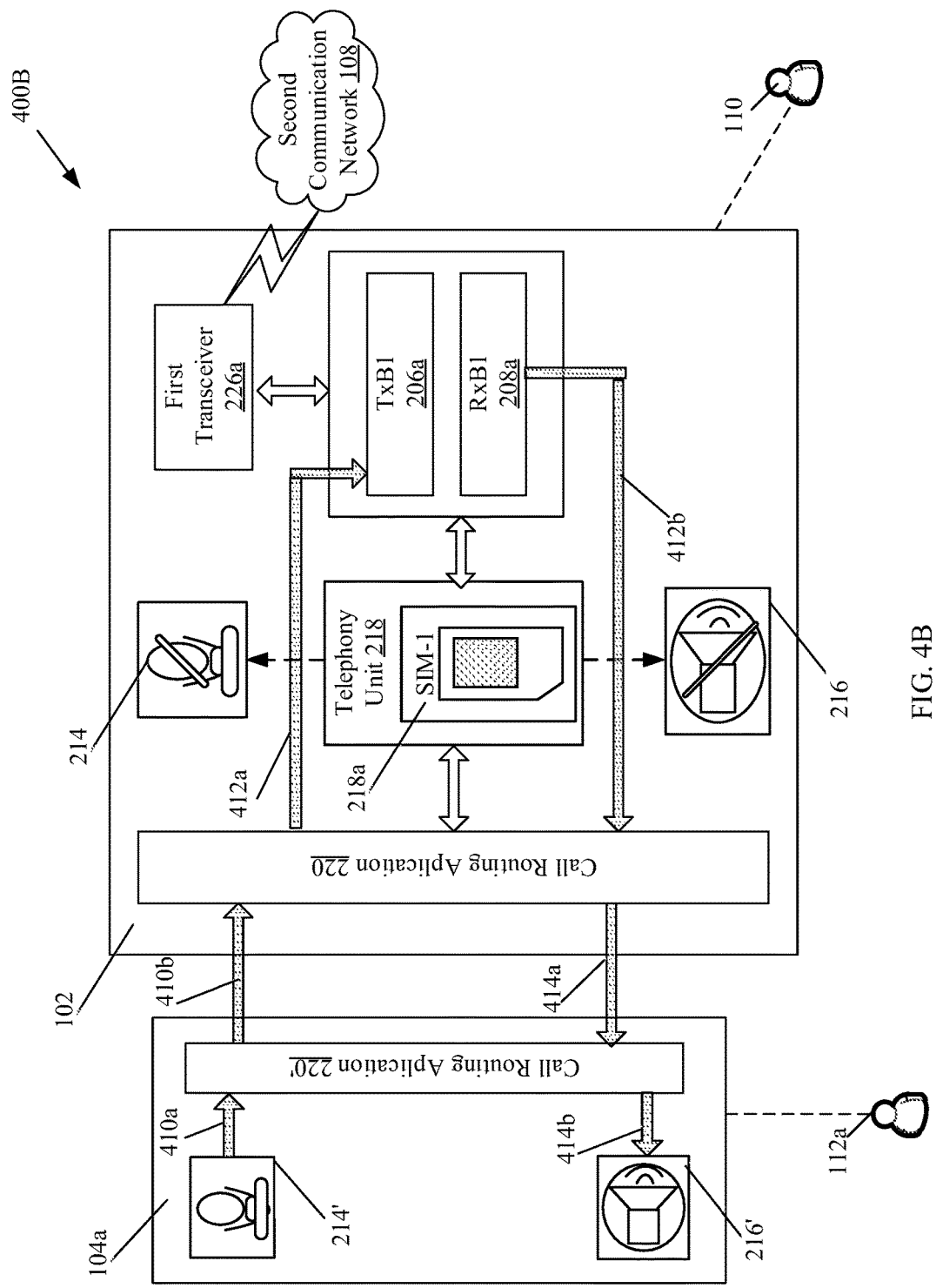

With reference to FIG. 4B, there is shown a second exemplary scenario 400B for call routing by the first communication device 102. FIG. 4B is explained in conjunction with elements from FIGS. 1, 2, 3, and 4A. The second exemplary scenario 400B includes the first communication device 102, the second communication device 104a, and the second communication network 108. The first communication device 102 is shown to include the call routing application 220, the telephony unit 218 with the first subscriber module 218a (represented as SIM-1), the microphone 214, and the speaker 216. The first communication device 102 is shown to further include the transmission buffer (TxB1) 206a, the reception buffer (RxB1) 208a, and the first transceiver 226a, which may be connected to the second communication network 108. Further, the buffers TxB1 206a and RxB1 208a may be associated with the first subscriber module 218a, such as the SIM-1, to buffer data related to calls made through the SIM-1 (as shown in FIG. 4B).

In FIG. 4B, the second communication device 104a is shown to include various components similar to that present in the first communication device 102, such as a complementary call routing application 220', a microphone 214', and a speaker 216'. The first communication device 102 and/or the second communication device 104a, may include various other components, such as those shown in FIG. 2, which have been excluded from FIG. 4B for the sake of brevity.

In addition, FIG. 4B illustrates various data flow steps between the components of the first communication device 102 and/or the second communication device 104a. The data flow steps may include an outgoing data transmission step 410a, an outgoing data reception step 410b, and an outgoing data storage step 412a. The data flow steps shown in FIG. 4B may further include an incoming data retrieval step 412b, an incoming data transmission step 414a, and an incoming data reception step 414b. One or more intermediate data flow steps have been excluded from FIG. 4B for the sake of brevity. Further, the microphone 214 and the speaker 216, which may be associated with the first subscriber module 218a, such as the SIM-1, are shown as disabled in FIG. 4B. The steps involved in the disabling of the microphone 214 and the speaker 216 have been explained previously in the FIG. 4A.

In accordance with an embodiment, the second exemplary scenario 400B (shown in FIG. 4B) may correspond to the case where the call between the second communication device 104a and the third communication device 104b, has been established by use of the first subscriber module 218a (such as SIM-1). The first communication device 102 may function as a network bridge to route the call between the second communication device 104a and the third communication device 104b. A first communication channel (not shown in FIG. 4B), via the first communication network 106, may connect the second communication device 104a to the first communication device 102 during the call, as explained in FIG. 3. Further, a second communication channel (not shown in FIG. 4B), via the second communication network 108, may connect the third communication device 104b to the first communication device 102 during the call.

In operation, during the call, the second user 112a may provide an audio input associated with the call via the microphone 214' of the second communication device 104a. The microphone 214' may convert the audio input of the second user 112a to an outgoing data stream. In accordance with an embodiment, the outgoing data stream may include the audio input packetized in the form of data packets (such as TCP/IP packets). Alternatively, the outgoing data stream may correspond to audio signals of the audio input as a stream of sound signals (stored as a sound recording file). The outgoing data stream may be stored in the memory of the second communication device 104a and/or transmitted to the call routing application 220' of the second communication device 104a (as shown in the outgoing data transmission step 410a).

The second communication device 104a, by use of the call routing application 220', may transmit the outgoing data stream to the first communication device 102, via the first communication channel (such as Wi-Fi or Bluetooth channel). The processor 202, use of the call routing application 220, may receive the outgoing data stream (as shown in the outgoing data reception step 410b) and store the received outgoing data stream in the TxB1 buffer 206a (as shown in the outgoing data storage step 412a). The first transceiver 226a may sequentially transmit the outgoing data stream stored in the TxB1 buffer 206a to the third communication device 104b, via the second communication channel (a cellular network).

In accordance with an embodiment, the first transceiver 226a may receive an incoming data stream from the third communication device 104b, via the second communication channel of the second communication network 108. The incoming data stream may include audio input associated with the call provided by the third user 112b. The incoming data stream may also include data packets that may include a representation of the audio input associated with the call, similar to the outgoing data stream. Alternatively, the incoming data stream may correspond to audio signals of the audio input of the third user 112b, as such as a stream of sound signals (stored as a sound recording file). In accordance with an embodiment, the first transceiver 226a may sequentially store the received incoming data stream in the RxB1 buffer 208a.

The first communication device 102, by use of the call routing application 220, of the first communication device 102, may sequentially retrieve the incoming data stream from the RxB1 buffer 208a (as shown in the incoming data retrieval step 412b). The first communication device 102, by use of the call routing application 220, may then transmit the retrieved incoming data stream (as shown in the incoming data transmission step 414a) to the second communication device 104a, via the first communication channel. The second communication device 104a, by use of the call routing application 220', may receive the incoming data stream (as shown in the incoming data reception step 414b) and store the received data in a portion of a memory (such as a playback buffer) of the second communication device 104a. Thereafter, the second communication device 104a may playback the audio input in the incoming data stream to the second user 112a, by use of the speaker 216' of the second communication device 104a.

A person skilled in the art may understand that the exemplary data flow steps explained in the second exemplary scenario 400B may be iterated through-out the duration of the call. Further, complementary data flow steps associated with the third communication device 104b may also be evident from the data flow steps described herein. In addition, a person skilled in the art may understand that the termination of the call may be initiated by either of the first user 110, the second user 112a, and/or the third user 112b. The termination of the call may cause the microphone 214 and the speaker 216 to be switched on for use along with the SIM-1 (that is, the first subscriber module 218a).

Figure 4C:
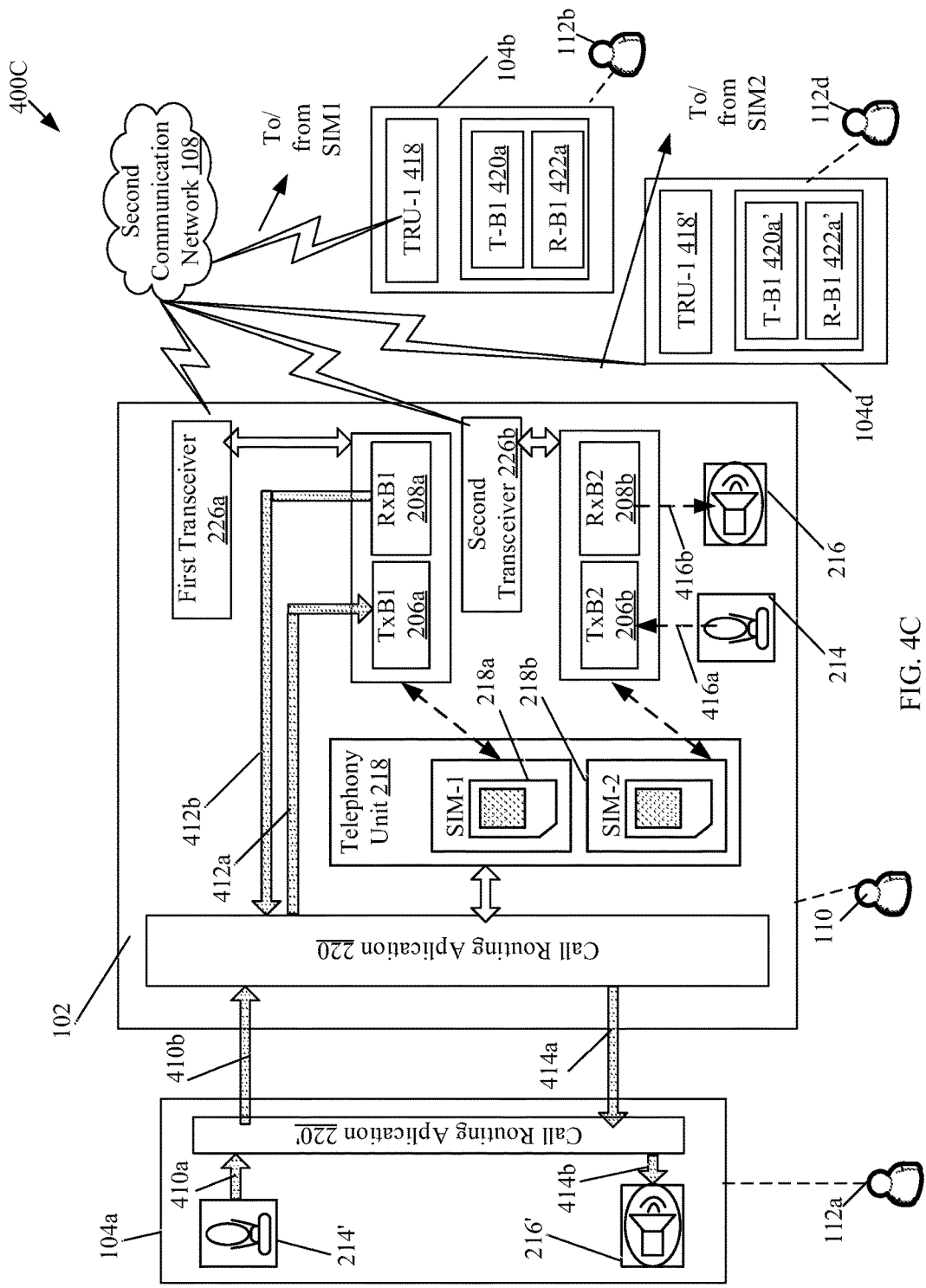

With reference to FIG. 4C, there is shown a third exemplary scenario 400C to route a call of the first communication device 102. FIG. 4C is explained in conjunction with elements from FIGS. 1, 2, 3, 4A, and 4B. The third exemplary scenario 400C may include the first communication device 102, the second communication device 104a, the third communication device 104b, the fifth communication device 104d, and the second communication network 108. The first communication device 102 is shown to include the call routing application 220, the telephony unit 218 associated with the subscriber modules 218a and 218b (represented as the SIM-1 and a SIM-2), the microphone 214, and the speaker 216. The first communication device 102 is shown to further include the first transceiver 226a and a second transceiver 226b from the one or more transceivers 226.

Further, shown herein are transmission and reception buffers associated with the first transceiver 226a (such as TxB1 206a and RxB1 208a) and the second transceiver 226b (such as TxB2 206b and RxB2 208b). Also, the buffers TxB1 206a and RxB1 208a may be associated with the first subscriber module 218a, such as the SIM-1. Further, the buffers TxB2 206b and RxB2 208b may be associated with the second subscriber module 218b, such as the SIM-2. The buffers may handle call related data that may be associated with respective subscriber modules, which is associated with the particular buffer. The first transceiver 226a and the second transceiver 226b are shown as connected to the second communication network 108. The microphone 214 and the speaker 216 may correspond to the second subscriber module 218b, such as the SIM-2. Hence, unlike the first exemplary scenario 400A of FIG. 4A, the microphone 214 and speaker 216 are shown as enabled, as these may interface with the second subscriber module 218b, such as the SIM-2.

In FIG. 4C, the components of the second communication device 104a may be similar as described in the FIG. 4B, such as the call routing application 220', the microphone 214', and the speaker 216'. Further, the third communication device 104b is shown to include a transceiver (TRU-1) 418, a transmission buffer (T-B1) 420a, and a reception buffer (R-B1) 422a. Similarly, the fifth communication device 104d may include a transceiver (TRU-1) 418', a transmission buffer (T-B1) 420a', and a reception buffer (R-B1) 422a'.

Various data flow steps between the different components of the first communication device 102, the second communication device 104a, the third communication device 104b, and/or the fifth communication device 104d, are further shown. The data flow steps (such as the steps 410a, 410b, 412a, 412b, 414a, and 414b) have been described in the FIG. 4B. One or more intermediate data flow steps have been excluded from FIG. 4C for the sake of brevity. The data flow steps 410a, 410b, 412a, 412b, 414a, and 414b (and their one or more intermediate steps) are associated with call routing between the second communication device 104a and the third communication device 104b.

In operation, the first communication device 102 may be configured to enable routing of the call between the second communication device 104a and the third communication device 104b, via the second communication network 108 (as explained in the steps 410a to 414b). The first communication device 102 may use the SIM-1 and the first transceiver 226a to route this call. The TRU-1 418 of the third communication device 104b may receive and transmit data streams associated with the call to/from the first communication device 102, via the second communication network 108. The TRU-1 418 may use the transmission buffer T-B1 420a and reception buffer R-B1 420b to buffer the data streams related to the call.

In accordance with an embodiment, the first communication device 102 may be configured to initiate another call in parallel to the ongoing call between the second communication device 104a and the third communication device 104b. For instance, the first user 110 may provide input through an interface associated with another instance of the core telephony module 222. This other instance of the core telephony module 222 may be associated with the SIM-2. The interface may present a dialer pad and/or contacts register, associated with the SIM-2 and/or pre-stored contacts at the first communication device 102, to the first user 110. The input may include a subscriber identification number (such as a mobile number) of a user with whom the first user 110 desires to speak (for instance, the fifth user 112d of the fifth communication device 104d). Based on the received input, the first communication device 102 may use the SIM-2 (such as the second subscriber module 218b) to establish a second call between the first communication device 102 and the fifth communication device 104d, via the second communication network 108. The core telephony module 222 may manage the assignment and usage of the second subscriber module 218b.

In accordance with an embodiment, during or before the second call, the microphone 214 of the first communication device 102 may be enabled to receive voice input related to the second call from the first user 110. Further, the speaker 216 of the first communication device 102 may be enabled to playback voice output of the second call for the first user 110. To buffer outgoing and incoming data streams related to the second call, the first communication device 102 may utilize active transmission and reception buffers, which may be different from that being used in the first call. That is, the transmission buffer TxB2 206b and the reception buffer RxB2 208b may be used to buffer outgoing and incoming data streams related to the second call. Further, the first communication device 102 may utilize the second transceiver 226b to transmit outgoing data stream of the second call, buffered in the transmission buffer TxB2 206b, to the fifth communication device 104, via the second communication network 108. The outgoing data stream may include voice or video call data received from the first user 110. The second transceiver 226b of the first communication device 102 may receive the incoming data stream of the second call from the fifth communication device 104, via the second communication network 108. The incoming data stream may then be stored or buffered in the reception buffer RxB2 206b. The buffered incoming data stream may be played back to the first user 110 using the speaker 216. The incoming data stream may include voice or video call data received from the fifth user 112d. It may be understood that complementary steps may be performed during the call in parallel by the various components of the fifth communication device 104d (such as in the transceiver TRU-1 418', the transmission buffer 420a', and the reception buffer 420b').

In accordance with an embodiment, the first communication device 102 may be configured to enable simultaneous use of the SIM-2 and the associated instance of the core telephony module 222 (such as the telephony application of the first communication device 102). This may be done to route a call in parallel to the ongoing call. The establishment and routing of such a parallel call may be performed in a manner similar to that of the ongoing routed call, but with the use of SIM-2 and its associated instance of the core telephony module 222.

For instance, the fourth communication device 104c (not shown in FIG. 4C; shown in FIG. 1) may send a request to the first communication device 102 for establishment and to route a call with the fifth communication device 104d. This may occur during an ongoing call routed by the first communication device 102. As shown in FIG. 1, the fourth communication device 104c, similar to the second communication device 104a, may be connected to the first communication network 106 and disconnected from the second communication network 108. The first communication device 102 may simultaneously establish and route this call between the fourth communication device 104c and the fifth communication device 104d, by use of the SIM-2, via the second communication network 108.

Figure 4D:
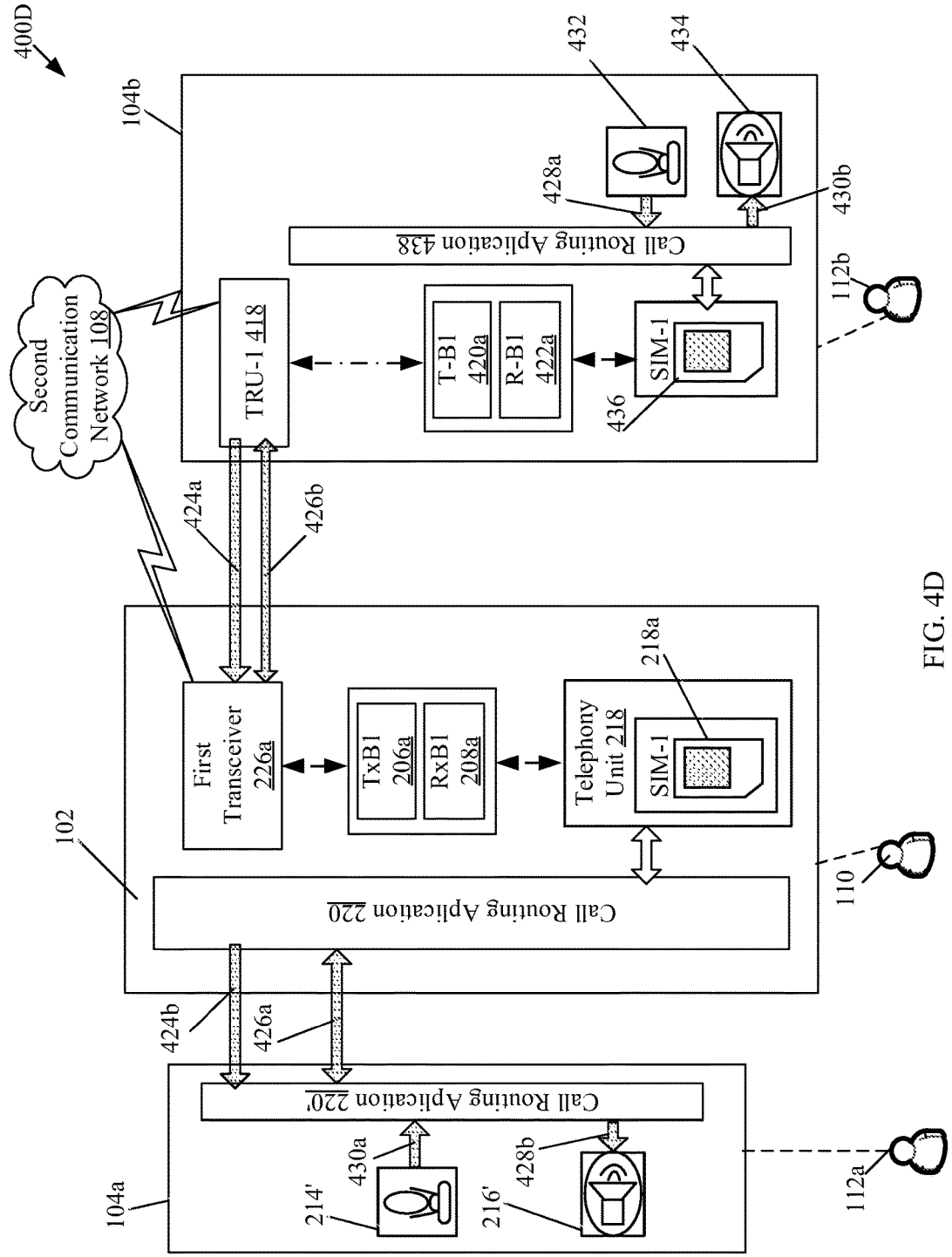

With reference to FIG. 4D, there is shown a fourth exemplary scenario 400D for call routing by the first communication device 102. FIG. 4D is explained in conjunction with elements from FIGS. 1, 2, 3, 4A, 4B, and 4C. The fourth exemplary scenario 400D includes the first communication device 102, the second communication device 104a, the third communication device 104b, and the second communication network 108. The first communication device 102 is shown to include the call routing application 220, and the telephony unit 218 with the first subscriber module 218a (represented as SIM-1). The first communication device 102 is shown to further include the transmission buffer (TxB1) 206a, the reception buffer (RxB1) 208a, and the first transceiver 226a, which may be connected to the second communication network 108. Further, the buffers TxB1 206a and RAH 208a may be associated with the first subscriber module 218a (such as the SIM-1) of the telephony unit 218, to buffer data related to calls made through the SIM-1 (as shown in FIG. 4D).

In FIG. 4D, the second communication device 104a is shown to include various components similar to that present in the first communication device 102, such as a complementary call routing application 220', a microphone 214', and a speaker 216'. Further, the third communication device 104b is also shown to include a complementary call routing application 438, a microphone 432, and a speaker 434. The third communication device 104b is further shown to include a cellular network SIM, such as a SIM-1 436 associated with a telephony unit (not shown in FIG. 4D) of the third communication device 104b. In addition, the third communication device 104b may also include the transceiver TRU-1 418 and associated buffers such as the transmission buffer T-B1 420a and the reception buffer 422a to buffer data associated with calls made through the SIM-1 436. The transceiver TRU-1 418 may connect the third communication device 104b to the second communication network 108 (such as a cellular network). A person skilled in the art may understand that the third communication device 104b may not necessarily include the complementary call routing application 438 such that the fourth exemplary scenario may be implemented without the presence of the complementary call routing application in the third communication device 104b. Thus, the third communication device 104b may be implemented as a basic cellular communication device without call routing support. Further, the first communication device 102, the second communication device 104a, and/or the third communication device 104b may include various other components, such as those shown in FIG. 2, which have been excluded from FIG. 4D for the sake of brevity.

In addition, FIG. 4D illustrates various data flow steps between the components of the first communication device 102, the second communication device 104a, and/or the third communication device 104b. The data flow steps may include an incoming call reception step 424a, an incoming call paging step 424b, a call acceptance step 426a, and a call establishment step 426b. The data flow steps shown in FIG. 4D may further include a first audio input step 428a, a first audio output step 428b, a second audio input step 430a, and a second audio output step 430b. One or more intermediate data flow steps have been excluded from FIG. 4D for the sake of brevity. Further, the microphone 214 and the speaker 216 (both not shown in FIG. 4D), which may be associated with the first subscriber module 218a, such as the SIM-1, may be disabled during the call between the third communication device 104b and the second communication device 104a. The steps involved in the disabling of the microphone 214 and the speaker 216 have been explained previously in the FIG. 4A.

In accordance with an embodiment, the fourth exemplary scenario 400D (shown in FIG. 4D) may correspond to the case where the first communication device 102 receives an incoming call from the third communication device 104b, via the second communication network 108 (a cellular network). The third communication device 104b may use the SIM-1 436 to initiate the call, and may send the call request through the transceiver TRU-1 418. The incoming call from the third communication device 104b may be received by the first transceiver 226a of the first communication device 102, as illustrated by the incoming call reception step 424a. In accordance with an embodiment, the incoming call may include a request to route the call to the second communication device 104a, which may be unreachable through the cellular network due to various reasons. For instance, lack of balance in subscription account, call barring, poor signal strength, out of network coverage, etc. Based on the received call routing request, the call routing application 220 may send an indication of the received incoming call including the call routing request to the second communication device 104a, as illustrated in the incoming call paging step 424b. The indication may be sent over the first communication network 106 (such as a Wi-Fi network) that may connect the first communication device 102 and the second communication device 104a. The complementary call routing application 220' of the second communication device 104a may receive the indication of the incoming call including the call routing request. In accordance with an embodiment, the indication may also include an identification of the third communication device 104b such as a subscriber identification number or telephone/mobile number of the third user 112b. The second user 112a may be prompted by the second communication device 104a to provide an input to accept or reject the incoming call.

Based on the input received from the second user 112a, the second communication device 104a may communicate a call acceptance (or call rejection) message to the first communication device 102, as illustrated in the call acceptance step 426a. In case the second user 112a accepts the incoming call (i.e., on receipt of the call acceptance message), the first communication device 102 may establish a call between the third communication device 104b and the second communication device 104a, thereby routing the incoming call. Before the establishment of the call, the second communication device 104a may connect to the first communication device 102, via the first communication network 106. During and after the establishment of the call, the first communication device 102 may communicate with the second communication device 104a and the third communication device 104b, over the first communication network 106 and the second communication network 108, respectively. The establishment of the call may include transmission of an indication to the third communication device 104b, which may indicate the acceptance of the call by the second user 112a. The establishment of the call may further include establishment of a communication channel between the third communication device 104b and the first communication device 102, and also between the first communication device 102 and the second communication device 104a. The establishment of the call is illustrated in FIG. 4D by the call establishment step 426b. At this stage, the second user 112a and the third user 112b may start their conversation.

In operation, during the call, the microphone 432 may receive voice input related to the established call from the third user 112b, as illustrated by the first audio input step 428a. The voice input received from the third user 112b may be stored in the transmission buffer T-B1 420a as outgoing data stream, which may then be transmitted by the transceiver TRU-1 418, over the second communication network 108, to the first communication device 102. In accordance with an embodiment, the SIM-1 436 of the third communication device 104b may perform the call handling related aspects of the call for the third communication device 104b. The voice input of the third user 112b may be received by the transceiver-1 226a of the first communication device 102 and stored in the reception buffer RxB1 208a as incoming data stream. The voice input of the third user 112b may be forwarded to the second communication device 104a by the call routing application 220. The call routing application 220' of the second communication device 104a may provide the received voice input to the speaker 216' for playback of the received voice input, as illustrated in the first audio output step 428b.

In accordance with an embodiment, the microphone 214' may similarly receive call related voice input from the second user 112a, which may be sent to the call routing application 220' for further forwarding, as illustrated in the second audio input step 430a. The call related voice input may be sent to the call routing application 220 of the first communication device 102, which may store the voice input of the second user 112a in the transmission buffer TxB1 206a as outgoing data stream. Thereafter, the first communication device 102 may forward the outgoing data stream including voice input of the second user 112a to the third communication device 104b, through the transceiver-1 226a, via the second communication network 108. The third communication device 104b may receive the voice input of the second user 112a through its transceiver TRU-1 418 and store the received voice input in its reception buffer R-B1 422a. Thereafter, the voice input of the second user 112a may be played back to the third user 112b through the speaker 434, as illustrated in the second audio output step 430b.

A person skilled in the art may understand that the exemplary data flow steps 428a, 428b, 430a, and 430b explained in the fourth exemplary scenario 400D may be iterated through-out the duration of the call. Further, complementary data flow steps associated with the third communication device 104b may also be evident from the data flow steps described herein. In addition, a person skilled in the art may understand that the termination of the call may be initiated by either of the first user 110, the second user 112a, and/or the third user 112b. The termination of the call may cause the microphone 214 and the speaker 216 to be switched on for use along with the SIM-1 (that is, the first subscriber module 218a). A person with ordinary skill in the art will understand that the four exemplary scenarios, 400A, 400B, 400C, and 400D, are provided for illustrative purposes and should not be construed to limit the scope of the disclosure. The disclosure may be implemented in various other scenarios with one or more variations, without departure from the scope of the disclosure. Further, the scope of the disclosure should not be limited to voice calls. The disclosure may also similarly be implemented for data transfer calls and/or video calls. In case of a video call, each communication device may be provided with a camera (such as a front-facing camera) and a display screen. The camera may receive outgoing video feed of a user (e.g., the second user 112a), while the display screen may display incoming video feed of another user (e.g., the third user 112b) associated with the video call.

Figure 5A:
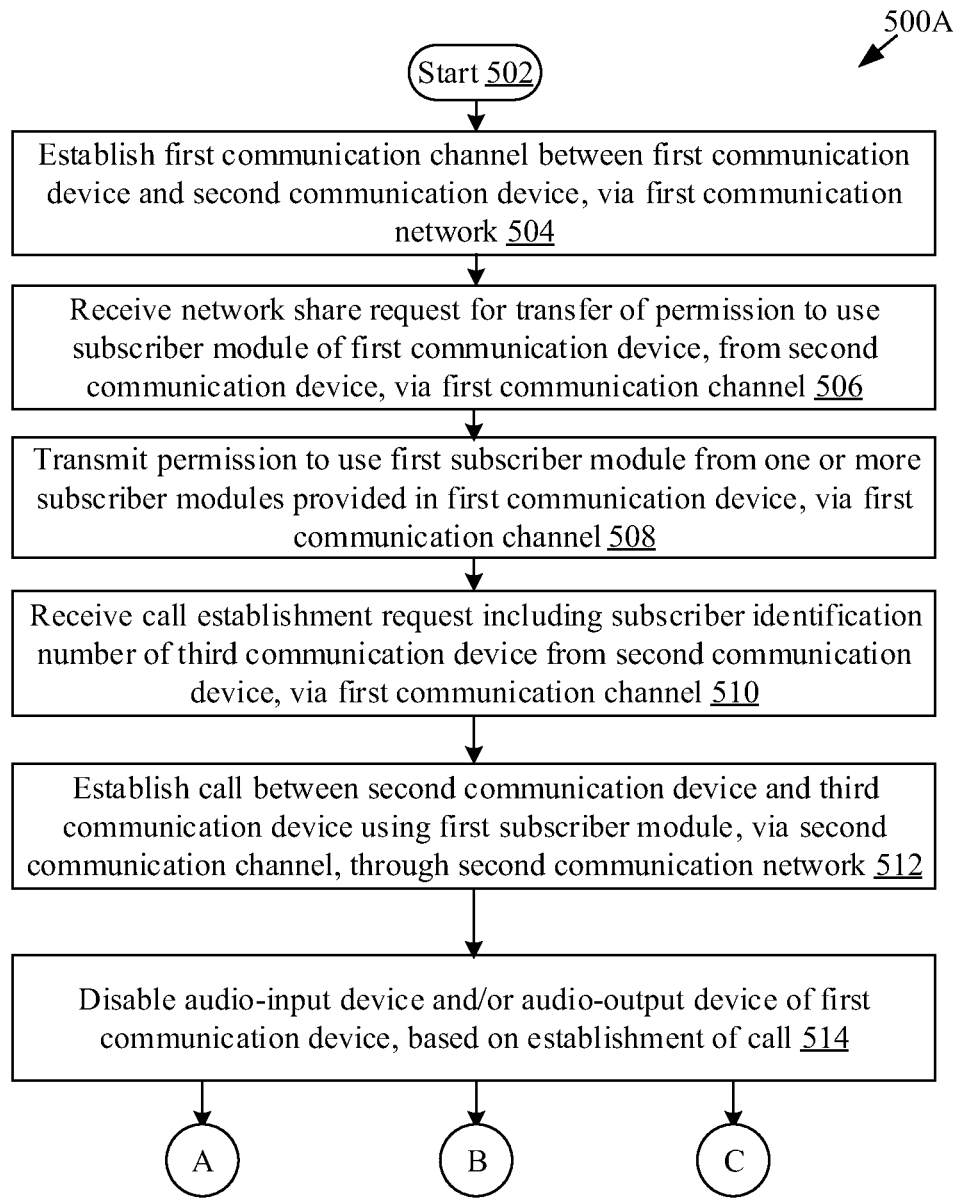
FIGS. 5A and 5B, collectively, depict a flow chart that illustrates a method to share a cellular network to route calls, in accordance with an embodiment of the disclosure.
Figure 5B:
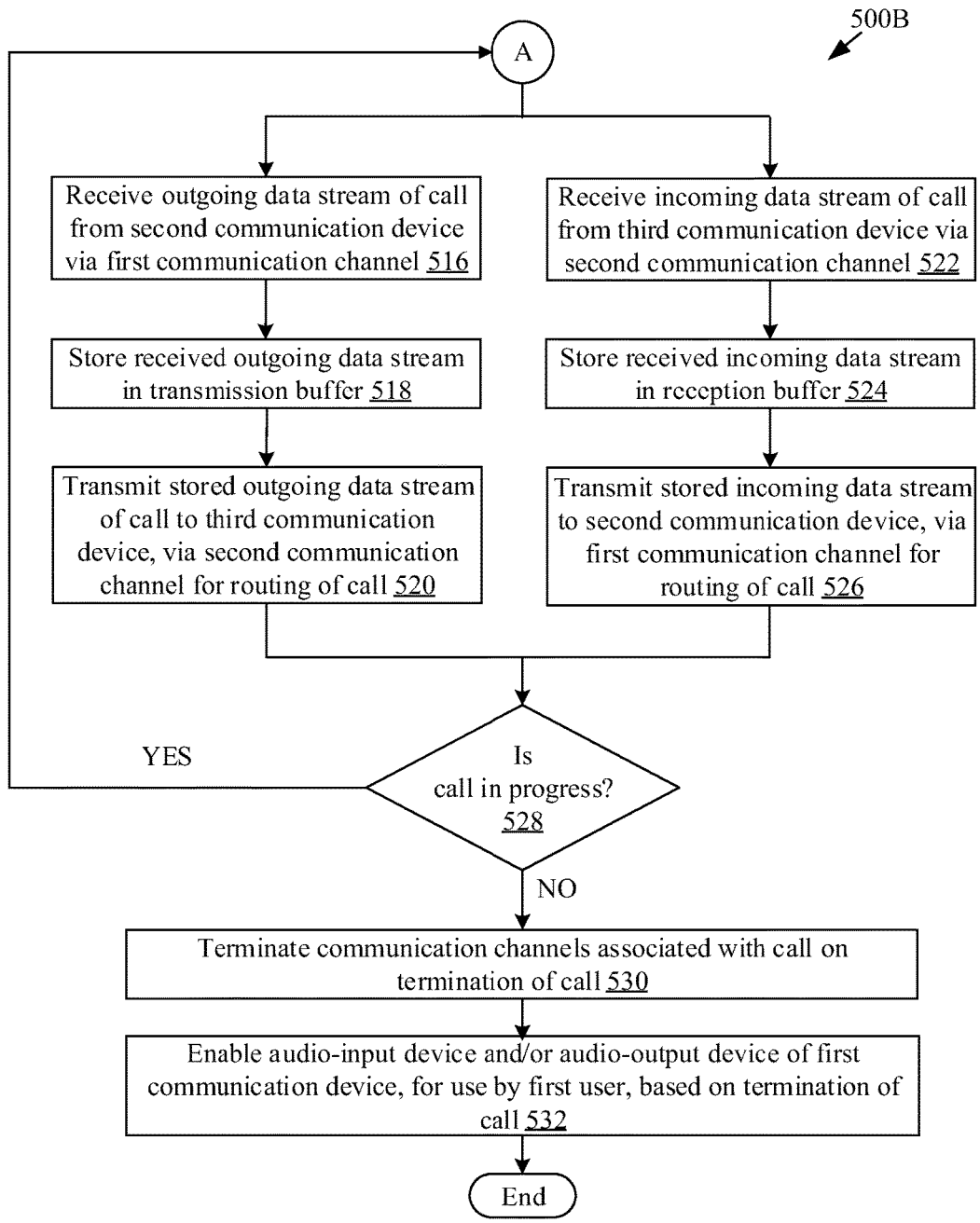
Figure 5C:
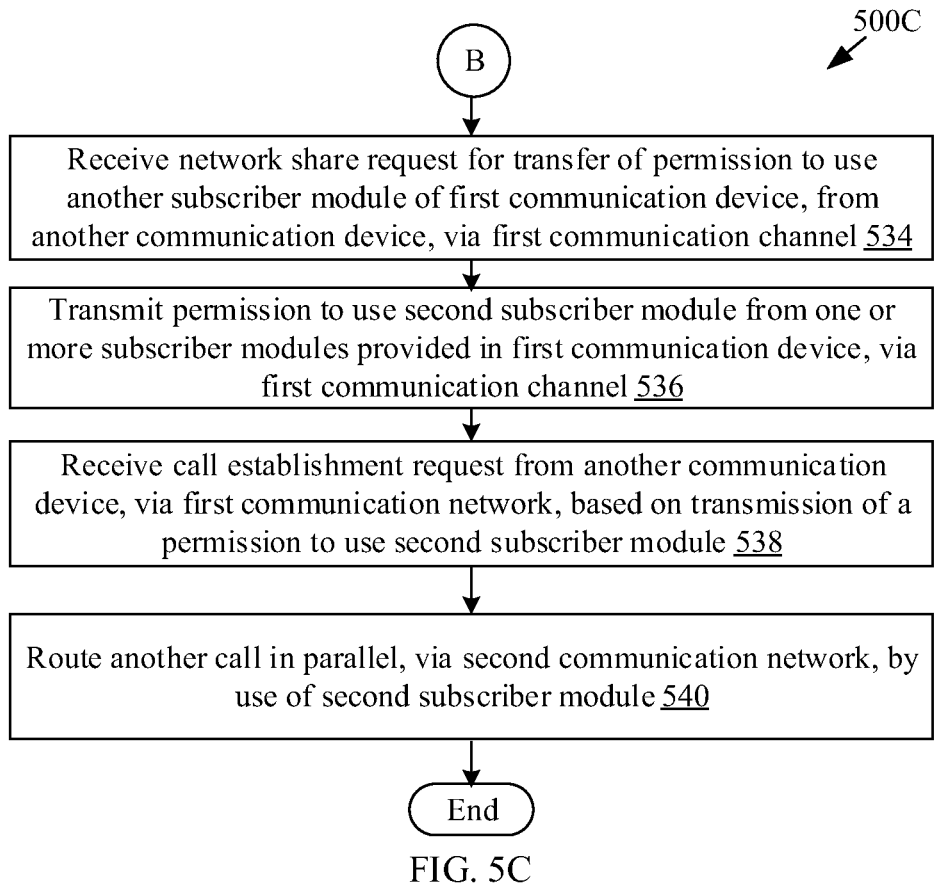
FIGS. 5C and 5D depict flow charts that illustrate method steps that may be performed in parallel with an ongoing call routing, as illustrated by the method of flow charts of FIGS. 5A and 5B.
Figure 5D:
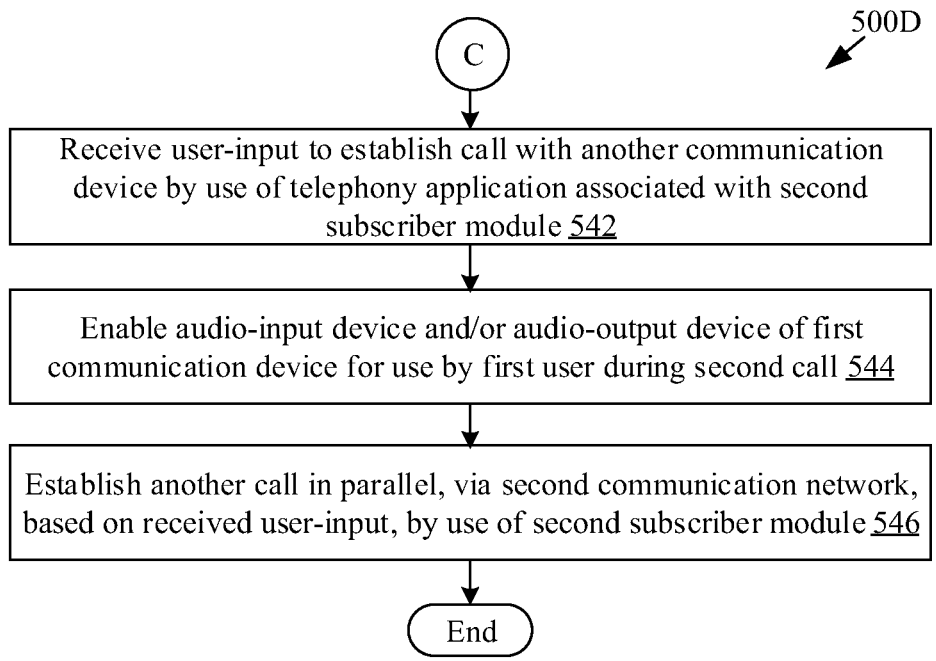

FIGS. 5A and 5B, collectively, depict a flow chart 500A that illustrate a method to route calls between communication devices, in accordance with an embodiment of the disclosure. FIGS. 5C and 5D depict flow charts 500C and 500D that illustrate method steps that may be performed in parallel with an ongoing call routing illustrated by the flow chart 500A of FIG. 5B. FIGS. 5A, 5B, 5C, and 5D are described in conjunction with FIGS. 1, 2, 3, and 4A to 4D. As shown in FIG. 5A, the method of the flow chart 500A starts at step 502 and proceeds to step 504.

At step 504, a first communication channel may be established between the first communication device 102 and the second communication device 104a, via the first communication network 106. In accordance with an embodiment, the one or more transceivers (such as the one or more transceivers 226) of each of the first communication device 102 and the second communication device 104a may connect to the first communication network 106, to establish the first communication channel. The first communication device 102 and the second communication device 104a may perform a pairing procedure to establish the first communication channel, based on exchange of pairing keys. For instance, a P2P Bluetooth-based communication or Wi-Fi-based communication may be established between the two communication devices, based on the exchange of pairing keys, network key, or Service Set Identifier (SS ID).

A person skilled in the art may understand that prior to step 504, the second communication device 104a may perform a check to determine signal strength associated with the second communication network 108, which may be received by its one or more transceivers 226. If the signal strength is below a predetermined threshold value associated with the type of the second communication network 108 (such as a $3^{rd}$ generation cellular network or call is barred), the second communication device 104a may initiate establishment of the first communication channel, as described in step 504.

At step 506, a network share request may be received from the second communication device 104a, for transfer of permission to use a subscriber module of the first communication device 102. In accordance with an embodiment, the first communication device 102, by use of the call routing module 224, may receive the network share request, via the first communication channel (over the first communication network 106), through the one or more transceivers 226. In response to the request, the call routing module 224, under the control of the processor 202, may present an interface to the first user 110 that may prompt the first user 110 to grant permission for use of one of the two subscriber modules (such as SIM-1 and SIM-2) to route a call. The interface may also prompt the first user 110 to prescribe a limit associated with the maximum time duration or usage charges associated with the call that is to be routed through a selected subscriber module, such as the first subscriber module 218a. In addition, the first user 110 may also specify a charge or fees that may be required to be credited to an account of the first user 110.

At step 508, a permission to use the first subscriber module 218a of the first communication device 102 may be transmitted to the second communication device 104a, via the first communication channel. The permission may be transmitted over the first communication network 106 by the one or more transceivers 226. Based on the transmitted permission, a control of a telephony application associated with first subscriber module 218a may be enabled by the second communication device 104a, via first communication channel. For instance, the instance of the core telephony module 222, which may be associated with the first subscriber module 218a may be transferred to the second communication device 104a. In accordance with an embodiment, the transfer of control may correspond to a remote control or terminal access of an interface associated with a given instance of the core telephony module 222, by the second communication device 104a. Thus, the second user 112a may be presented with a dialer interface associated with the instance of the core telephony module 222 associated with the first subscriber module 218a, on the second communication device 104a. Based on the dialer interface presented via the remotely controlled core telephony module 222, the second user 112a may provide a subscriber identification number of another user (such as the third user 112b), to route a call.

In accordance with an embodiment, the second communication device 104a may include a call routing application, similar to the call routing application 220 installed in the first communication device 102. Further, the call routing application may be configured to present the dialer interface at the second communication device 104a based on the received permission from the first communication device 102. Hence, the remote access of the instance of the core telephony module 222 at the second communication device 104a may not be necessary.

At step 510, a call establishment request may be received from second communication device 104a, via first communication channel. The call establishment request may include the subscriber identification number (such as a mobile number) of the third communication device 104b. In accordance with an embodiment, the second user 112a may provide an input of a subscriber identification number of a user with whom he/she desires to speak (such as the third user 112b), via the dialer interface. The second communication device 104a may transmit the call establishment request that includes the dialed number to the first communication device 102. The first communication device 102, by use of the core telephony module 222 associated with the first subscriber module 218a, may receive the dialed number to further process the call.

At step 512, a call may be established between the second communication device 104a and third communication device 104b. The call may be established, by use of the first subscriber module 218a, via a second communication channel in the second communication network 108. In accordance with an embodiment, the second communication network 108 may correspond to the cellular network. In accordance with an embodiment, the first communication device 102, by use of the core telephony module 222 associated with the first subscriber module 218a, may establish the call based on the received subscriber identification number. Further, the first communication device 102 may act as a bridge or interface between the first and the second communication channels. This may be done to route the call between the second communication device 104a and the third communication device 104b.

At step 514, an audio input device and/or an audio-output device, associated with the first subscriber module 218a, may be disabled based on the establishment of the call. In accordance with an embodiment, the call routing module 224 may be configured to disable the audio input device (such as the microphone 214) and/or the audio-output device (such as the speaker 216), as discussed in the first exemplary scenario 400A of FIG. 4A. A person skilled in the art may understand that other audio input devices and/or audio-output devices provided in the first communication device 102 may still be operational for other purposes, which may include placement of other calls and/or use of other application programs.

With reference to FIG. 5B, the flow chart 500A may progress to step 516 or step 522 in parallel. At step 516, outgoing data stream of the call may be received from the second communication device 104a, via the first communication channel. In accordance with an embodiment, the one or more transceivers 226 of the first communication device 102 may be configured to receive the outgoing data stream. The outgoing data stream may include audio input of the second user 112a, which may be associated with the call. At step 518, the received outgoing data stream may be stored in the transmission buffers 206. The one or more transceivers 226 and/or the call routing module 224 may be configured to store the received outgoing data stream in the transmission buffers 206 to route this data to the third communication device 104b.

At step 520, the stored outgoing data stream may be transmitted to the third communication device 104b, via the second communication channel, to route the call. In accordance with an embodiment, the one or more transceivers 226 may extract the stored outgoing data stream from the transmission buffers 206 and transmit the outgoing data stream to the third communication device 104b, via the second communication channel of the second communication network 108.

At step 522, the incoming data stream of the call may be received from the third communication device 104b, via the second communication channel (of cellular network). In accordance with an embodiment, the one or more transceivers 226 may be configured to receive the incoming data stream. The incoming data stream may include audio input of the third user 112b, which may be associated with the call. At step 524, the received incoming data stream may be stored in the reception buffers 208. The one or more transceivers 226 and/or the call routing module 224 may be configured to store the received incoming data stream in the reception buffers 208 to route this data to the second communication device 104a.

At step 526, to route the call, the stored incoming data stream may be transmitted to the second communication device 104a, via the first communication channel. In accordance with an embodiment, the one or more transceivers 226 may extract the stored incoming data stream from the reception buffers 208 and transmit the incoming data stream to the second communication device 104a, via the first communication channel (such as via the first communication network 106). As may be evident from the flow chart 500A, sequence of steps 516 to 520 may be performed in parallel with sequence of steps 522 to 526. Further, the sequence of steps 516 to 520 may be complementary and cyclic with respect to the sequence of steps 522 to 526, and vice versa.

At step 528, a check is performed to determine whether the call is still in progress. In accordance with an embodiment, the one or more transceivers 226 may be configured to perform the check under the control of the processor 202. To perform the check, the one or more transceivers 226 and/or the processor 202 may evaluate one or more parameters. Examples of these one or more parameters may include, but are not limited to, a signal strength of the first and the second communication channels, a ratio of data stored to storage capacity for the buffers, and/or a bit rate associated with the data streams of the call. When it is determined that the call is still in progress, the method of the flow chart 500A may repeat from steps 516 through 528. Otherwise, step 530 may be performed.

At step 530, communication channels associated with the call may be terminated. In accordance with an embodiment, based on the check performed at step 528, the status of the ongoing call may be determined, and it may be ascertained as to whether the call is still in progress. If the call is not in progress, the one or more transceivers 226 may terminate the first communication channel and the second communication channels, which may be associated with the call. At this stage, the first and the second communication channels may become idle and may require to be released as continuity of such channels may lead to a wastage of network resources.

At step 532, the first audio-input device and/or the first audio-output device associated with the first subscriber module 218a may be enabled, for use by the first user 110, based on the termination of the call. In accordance with an embodiment, the call routing module 224 may be configured to enable the first audio input device (such as the microphone 214) and/or the first audio-output device (such as the speaker 216) under the control of the processor 202. At this stage, the first user 110 may be use the first subscriber module 218a and its associated instance of the core telephony module 222. A new call may now be placed directly or routed via the first communication device 102, by use of the first subscriber module 218a. Control passes to end step.

One or more applications of the first communication device 102 may be operated by the first user 110, even during the progress of the routed call. In accordance with an embodiment, the one or more applications may be used to perform functionalities of the first communication device 102 that may not involve the use of the first subscriber module 218a and the associated instance of the core telephony module 222. Though, the one or more applications may use another microphone and/or speaker of the first communication device 102, which may not be disabled during the ongoing call.

With reference to FIG. 5C, the method of the flow chart 500B may be performed in parallel to method of the flow chart 500A of FIG. 5A and FIG. 5B. The flow chart 500C may progress to step 534 from the step 514 of FIG. 5A. At step 534, a network share request for transfer of permission to use another subscriber module of the first communication device 102 may be received from another communication device. The fourth communication device 104c may be an example of such a communication device from which the network share request may be received. The network share request may be received on a separate communication link (different from that used for the ongoing call) via the first communication network 106. Further, the network share request may be associated with request for permission to use the second subscriber module 218b of the first communication device 102. The first communication device 102, by use of the call routing module 224, may receive and process the network share request in a manner similar to that explained with reference to step 506.

At step 536, a permission to use the second subscriber module 218b of the first communication device 102 may be transmitted to the fourth communication device 104c, via the first communication network 106. At step 538, a call establishment request may be received from the other communication device (such as the fourth communication device 104c), via the communication link, based on the granted permission. In accordance with an embodiment, the fourth user 112c may provide an input of a subscriber identification number of a user with whom the fourth user 112c desires to speak (such as the fifth user 112d), on the fourth communication device 104c. The fourth communication device 104c may transmit the call establishment request that includes the dialed number to the first communication device 102. The first communication device 102, by use of the core telephony module 222 associated with the second subscriber module 218b, may receive the dialed number to further process the call.

At step 540, a routing of a call associated with the other communication device (such as the fourth communication device 104c) may be enabled by the first communication device 102, via the second communication network 108. The first communication device 102 may establish and route the call between the fourth communication device 104c and the fifth communication device 104d, based on the received call establishment request. In accordance with an embodiment, this call may be established and routed by use of the second subscriber module 218b, via the second communication network 108, in parallel to the ongoing call being routed by use of the first subscriber module 218a. The control may pass to end step, as shown.

With reference to FIG. 5D, the method of the flow chart 500C may be performed in parallel to method of the flow chart 500A of FIG. 5A and FIG. 5B. The flow chart 500C may progress to step 542 from the step 514 of FIG. 5A. At step 542, a user input may be received at the first communication device 102 to establish call with another communication device by use of a telephony application associated with the second subscriber module 218b of the first communication device 102. In accordance with an embodiment, the first user 110 may provide an input that includes a subscriber identification number of another user (such as the fifth user 112d), by use of the telephony application, such as another instance the core telephony module 222. The other instance of the core telephony module 222 (that is the telephony application) may be associated with the second subscriber module 218b.

At step 544, audio-input device and/or audio-output device of the first communication device 102 are enabled for use by the first user 110 in a second call. That is, during or before the establishment of the second call, the microphone 214 and the speaker 216 of the first communication device 102 may be enabled for the second call. Thus, the microphone 214 may be enabled to receive voice input related to the second call from the first user 110, while the speaker 216 may be enabled to playback voice output related to the second call for the first user 110. Outgoing and incoming data streams related to the second call may be buffered using a second set of buffers (which may be different from the buffers used in the first call, and hence, may be active for use in the second call). Further, a second transceiver of the first communication device 102 may be used for transmission and reception of the outgoing and incoming data streams of the second call.

At step 546, another call may be established, via the second communication network 108, based on the received user input, by use of the second subscriber module 218b. In accordance with an embodiment, the first communication device 102 may be configured to establish another call, in parallel to the ongoing call, via the second communication network 108. The call may be established between the first communication device 102 and the fifth communication device 104d, based on the subscriber identification number of the fifth user 112d, by use of the second subscriber module 218b. Control passes to end step.

In accordance with an exemplary aspect of the disclosure, a system to share cellular communication networks to route calls is disclosed. The system may include the first communication device 102 (FIG. 1), which may comprise one or more circuits (hereinafter referred to as the processor 202 (FIG. 2)). The processor 202 may be configured to receive a call establishment request including a subscriber identification number associated with the third communication device 104b (FIG. 1), via the first communication network 106 (FIG. 1). The first communication network 106 may connect the first communication device 102 with the second communication device 104a (FIG. 1). The processor 202 may be further configured to enable routing a call between the second communication device 104a and the third communication device 104b by use of the received subscriber identification number, based on the received call establishment request. The call may be routed via the second communication network 108 (FIG. 1) associated with the first subscriber module 218a (FIG. 2) of the first communication device 102.

In accordance with another exemplary aspect of the disclosure, another system to share cellular communication networks to route calls is disclosed. The system may include the first communication device 102, which may comprise one or more circuits (such as the processor 202 (FIG. 2)). The processor 202 may be configured to establish a wireless connection with the second communication device 104a (FIG. 1) via the first communication network 106 (FIG. 1). The processor 202 may be further configured to transmit a call establishment request including a subscriber identification number associated with the third communication device 104b (FIG. 1) to the second communication device 104a, via the first communication network 106 (FIG. 1). The first communication network 106 may connect the first communication device 102 with the second communication device 104a. The processor 202 may be further configured to enable establishing a call between the first communication device 102 and the third communication device 104b via the second communication device 104a. The routing of the call may be enabled by the second communication device 104a by use of the subscriber identification number, via the second communication network 108 (FIG. 1), which may be associated with a subscriber module of the second communication device 104a.

Various embodiments of the disclosure may provide a non-transitory computer readable medium and/or storage medium having stored thereon, a machine code and/or a computer program having at least one code section executable by a machine and/or a computer to share cellular communication networks to route calls. The at least one code section may cause the machine and/or computer (such as the first communication device 102 (FIG. 1)) to perform the steps that comprise the receipt of a call establishment request via the first communication network 106 (FIG. 1). The call establishment request may include a subscriber identification number associated with the third communication device 104b (FIG. 1). The first communication network 106 may connect the first communication device 102 with the second communication device 104a (FIG. 1). Further, routing of a call between the second communication device 104a and the third communication device 104b may be enabled by use of the received subscriber identification number, via the second communication network 108 (FIG. 1), based on the received call establishment request. The second communication network 108 may be associated with the first subscriber module 218a (FIG. 2) of the first communication device 102.

In accordance with an exemplary aspect, various embodiments of the disclosure may provide another non-transitory computer readable medium and/or storage medium, having stored thereon, a set of instructions executable by a machine and/or a computer to share cellular communication networks to route calls. The set of instructions may cause the machine and/or computer (such as the first communication device 102 (FIG. 1)) to perform the steps that comprise the establishment of a wireless connection with the second communication device 104a (FIG. 1). The wireless connection may be established via the first communication network 106 (FIG. 1). Thereafter, a call establishment request including a subscriber identification number associated with the third communication device 104b (FIG. 1) may be transmitted to the second communication device 104a. The call establishment request may be transmitted via the first communication network 106 that may connect the first communication device 102 with the second communication device 104a. Further, establishing of a call between the first communication device 102 and the third communication device 104b may be enabled via the second communication network 108 (FIG. 1). The routing of call may be enabled by the second communication device 104a to the third communication device 104b, by use of the received subscriber identification number, via the second communication network 108. The second communication network 108 may be associated with a subscriber module of the second communication device 104a.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein.

The present disclosure may be realized in hardware that comprises a portion of an integrated circuit that also performs other functions.

The present disclosure may also be embedded in a computer program product, which comprises all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. A first communication device, comprising:
circuitry configured to:
    receive a call establishment request from a second communication device via a first communication network,
    wherein said call establishment request includes a subscriber identification number of a third communication device, wherein said call establishment request is associated with a first call between said second communication device and said third communication device, and
    wherein said first communication network connects said first communication device with said second communication device; and
    route said first call between said second communication device and said third communication device via a second communication network, based on said subscriber identification number of said third communication device, and
    wherein said second communication network is associated with a first subscriber module of said first communication device.

2. The first communication device according to claim 1, wherein said first communication network corresponds to at least one of a Bluetooth based network, a Wi-Fi based network, a Light-Fidelity based network, a short-range wireless communication network, a Wi-Max based network, an Internet-of-Things (IoT) network, or a Machine-Type-Communication (MTC) network, and wherein said second communication network corresponds to a cellular communication network.

3. The first communication device according to claim 1, wherein said circuitry is further configured to receive, via said first communication network, a network share request from said second communication device,
    wherein the network share request corresponds to a request for transfer of a permission, and
    wherein said permission is associated with utilization of said first subscriber module of a plurality of subscriber modules of said first communication device.

4. The first communication device according to claim 3, wherein said circuitry is further configured to transmit the permission to said second communication device via said first communication network.

5. The first communication device according to claim 1, wherein said circuitry is further configured to enable control of a telephony application by said second communication device, via said first communication network, and
wherein said telephony application is associated with said first subscriber module.

6. The first communication device of claim 1, wherein said circuitry is further configured to establish said first call between said second communication device and said third communication device via said second communication network based on said first subscriber module and said call establishment request.

7. The first communication device of claim 6, wherein said circuitry is further configured to disable, based on said establishment of said first call at least one of a first audio input device associated with said first subscriber module or a first audio output device associated with said first subscriber module.

8. The first communication device according to claim 1, wherein said circuitry is further configured to receive, via said first communication network, an outgoing data stream of said first call from said second communication device.

9. The first communication device of claim 8, wherein said circuitry is further configured to store said outgoing data stream in a transmission buffer, and wherein said transmission buffer corresponds to a first transceiver of said first communication device.

10. The first communication device of claim 9, wherein said circuitry is further configured to transmit, via said second communication network, said outgoing data stream to said third communication device to route said first call.

11. The first communication device according to claim 1, wherein said circuitry is further configured to receive, via said second communication network, an incoming data stream of said first call from said third communication device.

12. The first communication device according to claim 11, wherein said circuitry is further configured to store said incoming data stream in a reception buffer, and wherein said reception buffer corresponds to a first transceiver of said first communication device.

13. The first communication device according to claim 12, wherein said circuitry is further configured to transmit, via said first communication network, said incoming data stream to said second communication device to route said first call.

14. The first communication device according to claim 1, wherein said circuitry is further configured to transmit a permission to a fourth communication device,
wherein said permission is associated with utilization of a second subscriber module of a plurality of subscriber modules in said first communication device,
wherein said permission is transmitted via said first communication network that connects said first communication device with said fourth communication device, and
wherein said permission is associated with said utilization of said second subscriber module in parallel with said first call.

15. The first communication device according to claim 14, wherein said circuitry is further configured to route a second call in parallel with said first call based on said second subscriber module.

16. The first communication device according to claim 1, wherein said circuitry is further configured to establish a second call with a fourth communication device via a cellular communication network, and wherein said cellular communication network is associated with a second subscriber module of a plurality of subscriber modules of said first communication device.

17. The first communication device according to claim 16, wherein said second call is established in parallel with said first call.

18. A first communication device, comprising:
circuitry configured to:
establish a wireless connection with a second communication device via a first communication network;
transmit a call establishment request including a subscriber identification number of a third communication device to said second communication device, wherein said call establishment request is transmitted via said first communication network based on said wireless connection, and
wherein said call establishment request is associated with a call between said first communication device and said third communication device; and
establish said call between said first communication device and said third communication device via said second communication device,
wherein said call is routed by said second communication device, via a second communication network, to said third communication device based on said subscriber identification number and wherein said second communication network is associated with a subscriber module of said second communication device.

19. The first communication device according to claim 18, wherein said circuitry is further configured to:
receive, via said first communication network, a control of a telephony application associated with said subscriber module of said second communication device; and
enable, based on said received control of said telephony application, a dialing operation of said subscriber identification number at said first communication device for said transmission of said subscriber identification number to said second communication device.

20. The first communication device according to claim 18, wherein said circuitry is further configured to:
receive an input via a pre-installed application in said first communication device; and
enable, based on said input, a dialing operation of said subscriber identification number via said pre-installed application at said first communication device for said transmission of said subscriber identification number to said second communication device.

21. The first communication device according to claim 18, wherein said circuitry is further configured to transmit, via said first communication network, an outgoing data stream of said call to said second communication device, and
wherein said outgoing data stream is routed from said second communication device to said third communication device, via said second communication network available at said second communication device.

22. The first communication device according to claim 18, wherein said circuitry is further configured to receive, via said first communication network, an incoming data stream of said call from said second communication device, and wherein said second communication device records said call received from said third communication device for route of said call to said first communication device.

* * * * *